(12) United States Patent
Evenson et al.

(10) Patent No.: US 8,491,861 B2
(45) Date of Patent: Jul. 23, 2013

(54) SYNTHETIC PROCESS FOR PREPARATION OF HIGH SURFACE AREA ELECTROACTIVE COMPOUNDS FOR BATTERY APPLICATIONS

(75) Inventors: Carl Evenson, Lafayette, CO (US); Richard Mackay, Lafayette, CO (US)

(73) Assignee: Eltron Research, Inc., Boulder, CO (US)

( * ) Notice: Subject to any disclaimer, the term of this patent is extended or adjusted under 35 U.S.C. 154(b) by 1733 days.

(21) Appl. No.: 11/753,485

(22) Filed: May 24, 2007

(65) Prior Publication Data

US 2013/0153821 A1    Jun. 20, 2013

Related U.S. Application Data

(60) Provisional application No. 60/803,292, filed on May 26, 2006.

(51) Int. Cl.
*C01B 25/45* (2006.01)
*H01M 4/02* (2006.01)
*H01M 4/04* (2006.01)
*H01M 4/13* (2010.01)

(52) U.S. Cl.
USPC ........... 423/306; 429/220; 429/221; 429/223; 429/224; 429/231.95

(58) Field of Classification Search
USPC ........................................... 423/306
See application file for complete search history.

(56) References Cited

U.S. PATENT DOCUMENTS

| 5,705,296 | A | 1/1998 | Kamauchi et al. |
| 5,925,590 | A | 7/1999 | White et al. |
| 7,939,201 | B2 * | 5/2011 | Chiang et al. ............ 429/231.95 |
| 8,168,150 | B2 * | 5/2012 | Hemmer et al. .............. 423/306 |
| 8,313,863 | B2 * | 11/2012 | Exnar et al. .............. 429/231.95 |
| 8,323,832 | B2 * | 12/2012 | Chiang et al. ................. 429/221 |
| 2003/0027049 | A1 | 2/2003 | Barker et al. |
| 2007/0160752 | A1 | 7/2007 | Mao |
| 2011/0017947 | A1 * | 1/2011 | Nuspl et al. ................ 252/182.1 |

OTHER PUBLICATIONS

Zhang et al, "Nanostructured LiMn2O4 prepared by a glycine-nitrate process for lithium-ion batteries", Solid State Ionics 171 (2004) 25-31.*

* cited by examiner

*Primary Examiner* — Wayne Langel
(74) *Attorney, Agent, or Firm* — Conley Rose, P.C.

(57) ABSTRACT

A process is disclosed for the preparation of electroactive cathode compounds useful in lithium-ion batteries, comprising exothermic mixing of low-cost precursors and calcination under appropriate conditions. The exothermic step may be a spontaneous flameless combustion reaction. The disclosed process can be used to prepare any lithium metal phosphate or lithium mixed metal phosphate as a high surface area single phase compound.

23 Claims, 27 Drawing Sheets

SYNTHETIC PROCESS FOR PREPARATION OF HIGH SURFACE AREA ELECTROACTIVE COMPOUNDS FOR BATTERY APPLICATIONS

CROSS-REFERENCE TO RELATED APPLICATIONS

This application claims benefit of U.S. provisional application Ser. No. 60/803,292 filed May 26, 2006, and entitled "Synthetic Process for Preparation of High Surface Area Electroactive Compounds for Battery Applications," which is hereby incorporated herein by reference in its entirety.

STATEMENT REGARDING FEDERALLY SPONSORED RESEARCH OR DEVELOPMENT

This invention was made with U.S. Government support under the EPA Contract No. EP-D-04-033 and the Department of Energy Contract No. DE-FG02-05ER84229. The U.S. Government has certain rights in this invention.

BACKGROUND

1. Field of the Invention

This invention relates generally to the field of lithium ion batteries. More specifically, the inventions relates to a process for making high surface area lithium metal phosphates for use as battery cathodes.

2. Background of the Invention

Lithium metal phosphates have emerged as the cathode material of choice for the next generation of lithium-ion secondary batteries used in portable electronics, power tools, and hybrid and electric vehicles due to the fact that lithium metal phosphates have been shown to possess high specific capacities, are more thermally stable than current metal oxide based cathodes, and are environmentally friendly.

$LiFePO_4$ has been characterized as a cathode material. $LiFePO_4$ crystallizes in the olivine structure in which $FeO_6$ octahedra are linked together with $PO_4$ tetrahedra. Lithium is found in the channels created by the linked polyhedra. The advantages of $LiFePO_4$ include its capacity, stability over repeated cycling, and its environmental friendliness. The disadvantage of $LiFePO_4$, as with most phosphate cathode materials, is that the electronic conductivity of $LiFePO_4$ is low. To improve the electronic conductivity necessary for effective batteries, carbon black has been mixed with $LiFePO_4$ to form the battery cathode. $LiFePO_4$ is currently prepared by carbothermal reduction (CTR) or solid state processing. In carbothermal reduction, elemental carbon is added to a mixture of lithium carbonate, iron oxide, and diammonium hydrogen phosphate. As the mixture is heated the carbon reduces the iron and CO or $CO_2$ is produced. The final product is coated with any excess carbon.

Lithium vanadium phosphates have also been characterized as potential battery cathode materials. $Li_3V_2(PO_4)_3$ is found either in the rhombohedral NASICON structure or a monoclinic form. The monoclinic form of $Li_3V_2(PO_4)_3$ has a high specific capacity of 197 mAh/g. The structure contains three crystallographically distinct lithium atoms that can be removed between two and five volts. The first lithium is removed between 3.6 and 3.7 volts (vs. $Li/Li^+$) and the second lithium is removed at 4.08 V (vs. $Li/Li^+$). Removal of these two lithium atoms corresponds to the $V^{3+}/V^{4+}$ redox couple. The third lithium in $Li_3V_2(PO_4)_3$ is removed at 4.55 V vs. $Li/Li^+$ and corresponds to the $V^{4+}/V^{5+}$ redox couple.

There are several other vanadium phosphate materials that have potential as lithium-ion battery cathode materials. $LiVOPO_4$ is found in both an α and β-phase. α-$LiVOPO_4$ has been reported to be the thermodynamically stable phase. β-$LiVOPO_4$ converts to α-$LiVOPO_4$ when heated above 750° C. Structurally, both the α- and β-phases contain infinite chains or columns of trans corner-sharing $VO_6$ octahedra. These chains are roughly arranged in a close packing configuration. In the α-structure, the $VO_6$ octahedra are staggered, and the phosphorous and lithium fill the interstitial site between the chains in an alternating pattern. The phosphorous is tetrahedrally coordinated, and the lithium is five-coordinated. In the β-phase, the $VO_6$ octahedra are eclipsed. The phosphorous forms $PO_4$ tetrahedra in alternating sites by linking the corners of adjacent $VO_6$ octahedra. The lithium ions are situated in six coordinate interstitial sites between the $PO_4$ and $VO_6$ polyhedra. Unfortunately, materials such as $LiVOPO_4$ and $LiVP_2O_7$ have not been thoroughly investigated due to the fact that a simple synthetic procedure has not been available to prepare high surface area powders with these compounds.

The traditional methods for preparation of these types of compounds include carbothermal reduction, traditional solid-state processing, and glycine nitrate combustion synthesis. In carbothermal reduction, reactants are dry mixed with elemental carbon, pelletized, calcined in an inert atmosphere, ground up, re-pelletized, re-calcined, and ground up a second time. The carbon acts as a reducing agent for reducing the metal(s) in the reactant mixture.

Solid-state processing involves mixing oxide precursors, typically by ball milling, followed by calcining the powder one or more times. However, such solid state processing methods have been unable to produce high surface area powders.

In the glycine nitrate method of combustion synthesis, metal nitrate precursors are dissolved in water with glycine ($NH_2CH_2COOH$). The glycine acts both as a chelating agent that provides uniform mixing of the metal precursors, and as the fuel during combustion. The mixture is heated, and the water evaporates until spontaneous ignition occurs. The glycine and nitrates react exothermically producing flames, carbon oxides and nitrogen oxides, and a solid crystalline product. In a typical reaction, the flame temperature during combustion can reach 1800° C. However, glycine nitrate combustion synthesis does not produce the high surface area needed for adequate lithium intercalation.

Consequently, there is a need for a simple and cost-effective process of preparing high surface area lithium metal phosphates using a variety of metals including vanadium.

BRIEF SUMMARY

These and other needs in the art are addressed in an embodiment described in the present disclosure for a process of making a lithium metal phosphate powder comprising combining a metal precursor, a lithium precursor, a phosphorous precursor, and a chelating carbon source in a solution to form a mixture. The process further comprises heating the mixture such that flameless combustion occurs to form a porous powder. Moreover the process comprises calcining the powder to produce the lithium metal phosphate powder. In an embodiment, the lithium metal phosphate powder has a surface area of at least 10 m²/g.

In another embodiment, a process for making a high surface area powder comprises combining at least a glycine and a nitrate to form a mixture. The process also comprises heating the mixture such that flameless combustion occurs to form the high surface area powder. In addition the process comprises calcining the powder.

During the exothermic reaction no flames are evolved and a crystalline product is not obtained directly from the reaction. This is a significant difference compared to combustion synthesis. First, it makes the process scaleable for manufacturing. Second, this exothermic process leads to high surface area compounds as some reactants are burned out during calcining rather than during the combustion step. Third, the process may allow some residual carbon to remain on or with the powder. Finally, this incomplete or mild exothermic reaction may allow formation of metastable phases which cannot be done with carbothermal, solid-state, or traditional glycine nitrate synthesis.

This method is not a carbothermal reduction. Carbon may be found in the powder resulting from the mild exothermic reaction; however, no elemental carbon is added to the reaction mixture. In addition, carbothermal reduction is typically carried out in an inert atmosphere. The disclosed process may involve a calcining step that may include a reducing atmosphere, an inert atmosphere, or a partially reducing atmosphere.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
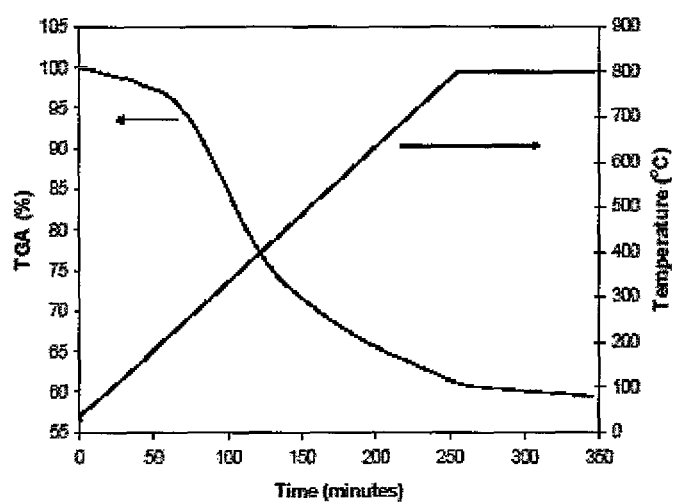
FIG. 1 shows TGA percent weight loss and temperature as a function of time.

In an embodiment, the process for making a lithium metal phosphate powder involves the combination of a metal precursor, a lithium precursor, a phosphorous precursor, and a fuel to form a mixture. In certain embodiments, the mixture may comprise an aqueous solution. The metal precursor, the lithium precursor, the phosphorous precursor, and the fuel may be dissolved in water to form the aqueous solution.

The metal precursors may comprise any suitable precursors including without limitation, metal nitrates, carbonates, etc. In an embodiment, the metal precursor is water soluble. Additionally, the metal precursor may comprise any suitable metal. In some embodiments, the metal may comprise a transition metal. Examples of suitable metals include without limitation, Fe, V, Ni, Co, Cr, Cu, or Mn. In specific embodiments, the metal precursor may comprise metal nitrates. Examples of metal nitrates include without limitation, lithium nitrate, iron (III) nitrate nitrate hydrate, manganese (II) nitrate hydrate, nickel (II) nitrate hydrate, copper (II) nitrate hydrate, cobalt (II) nitrate hydrate, chromium (III) nitrate hydrate, etc. In a typical embodiment, the metal precursor may comprise ammonium metavanadate. The phosphorous precursor may be a low-cost water soluble compound such as ammonium dihydrogen phosphate, diammonium hydrogen phosphate, or phosphoric acid. In addition, the metal precursor may comprise an iron organic ligand complex such as without limitation, iron(II) gluconate dihydrate.

In particular embodiments, the fuel may be glycine or a glycine derivative. However, any suitable fuel may be utilized. Examples of suitable fuels include without limitation, hydrazine, sucrose, carbazole, urea, malonic acid, citric acid, or combinations thereof.

Furthermore, in an embodiment, the metal precursor and the fuel precursor are the same compound, such as without limitation, iron(II) gluconate dihydrate. That is, metal precursor is a water soluble precursor that is already coordinated by a fuel. In such an embodiment, a fuel, such as glycine, would not have to be added to the reaction mixture. For example, iron(II) gluconate calcinati (i.e. $(HOCH_2[CH(OH)]_4CO_2)_2$ $Fe.2H_2O$) is essentially an iron coordinated by a fuel which is similar to glycine. Without being limited by theory, an added benefit may be that replacing iron nitrate with iron(II) gluconate dihydrate may remove excess nitrates ($NO_x$ formers) from the reaction. Thus, in one embodiment, production of lithium iron phosphate is shown in Equation 1. Gaseous byproducts of the reaction are not shown for simplicity.

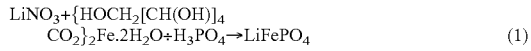

$$LiNO_3 + \{HOCH_2[CH(OH)]_4CO_2\}_2Fe.2H_2O + H_3PO_4 \rightarrow LiFePO_4 \quad (1)$$

In another embodiment, the reaction may be further modified by using lithium carbonate as the lithium precursor instead of lithium nitrate. In an additional embodiment, ammonium nitrate may be added. The reaction for this embodiment is shown in Equation 2.

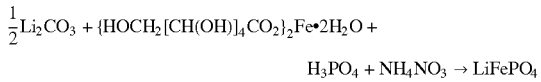

$$\frac{1}{2}Li_2CO_3 + \{HOCH_2[CH(OH)]_4CO_2\}_2Fe\cdot 2H_2O + H_3PO_4 + NH_4NO_3 \rightarrow LiFePO_4 \quad (2)$$

In an embodiment, the precursors may be combined in water at a desired ratio. In an embodiment, the water is deionized water. Preferably, the water is warmed when combined with the precursors. The ratio of the lithium precursor, the metal precursor, the phosphorous precursor and the fuel may be determined by the stoichiometry of the desired product. In an embodiment, the ratio may be about 2:3:3:2. The amount of fuel may be varied according to need. In an embodiment, the mole ratio of metal to fuel may range from about 1:10 to about 10:1, alternatively from about 1:9 to about 9:1, alternatively from about 1:8 to about 8:1. Alternatively, the ratio of fuel to lithium precursor may be about 3:2, alternatively about 3:1.

In another embodiment, the process may further comprise doping the lithium metal phosphate with an alkaline earth metal. Examples of suitable alkaline earth metals include without limitation, Be, Mg, Ca, Sr, Ba, or Ra. Alternatively, the doping precursor may comprise second or third row transition metals such as Cr, Mn, Fe, Co, Ni, Cu, or Zn. Alternatively, the doping precursor may comprise a rare-earth element. The doping step may comprise combining an additional doping precursor to the reaction mixture. In an embodiment, the doping precursor may be magnesium nitrate hydrate. The lithium metal phosphate powders may be doped with an alkaline earth metal at a level ranging, from about 0.01 moles to about 0.5 moles, alternatively from about 0.03 moles to about 0.4 moles, alternatively from about 0.05 moles to about 0.3 moles of metal.

In typical embodiments, the mixture may be slowly heated until the mixture reacts or combusts spontaneously. As used herein, the terms "flameless combustion" or "combusts" is used to describe rapid exothermic spontaneous reactions in which the reaction mixtures do not ignite or form flames. This type of combustion is also known as smoldering or smoldering combustion. The mixture may be heated at rate of no more than about 5 degree/min, alternatively about 3 degree/min. Furthermore, the mixture may be heated for a period ranging from about 30 seconds to about 30 minutes, alternatively from about 5 minutes to about 20 minutes, alternatively from about 10 to about 15 minutes. During the reaction, a mixture of water vapor and gaseous byproducts may be rapidly evolved leaving behind an ash-like powder. Preferably, the mixture may be heated such that the mixture is not ignited and no flames may be observed. Without being limited by theory, it is believed that flameless combustion (i.e. slow heating step without ignition) prevents formation of crystals and allows high surface area powders to be formed. During the heating, the mixture may be stirred to ensure uniform heating. In alternative embodiments, the process may comprise a precipitation step prior to flameless combustion.

The powder may be ground and calcined under any suitable atmosphere. Examples of suitable atmospheres include without limitation, air, inert gas, partially reducing (10% $H_2$), or a fully reducing (100% $H_2$) atmosphere. The calcining temperature may range from about 250° C. to about 1000° C., alternatively from about 650° C. to about 850° C. In embodiments, the powder may be calcined for a time period ranging from about 1 hour to about 10 hours, alternatively from about 2 hours to about 8 hours, alternatively from about 4 hours to about 6 hours. In addition, the calcining step may comprise one or more calcining steps. The powder may be re-mixed in between the calcining steps. The additional calcining steps may be at the same temperature and atmosphere. In alternative embodiments, the additional calcining steps may be at a different temperature and atmosphere.

In embodiments, the lithium metal phosphate powder may have the formula, $Li_xM_y(PO_4)_z$. M may be atoms of Fe, V, Ni, Co, Cr, Cu, VO, Mg, Mn, and combinations thereof. The subscripts x, y, and z represent the number of atoms of Li, M, and $PO_4$, respectively. Subscripts x, y, and z are typically such that the lithium metal phosphate powder has no charge and may range from 1 to 3. In other embodiments, the powder may have the formula $LiMP_2O_7$, where M may be atoms of Fe, V, Ni, Co, Cr, Cu, VO, Mg, Mn, or combinations thereof. Examples of lithium metal phosphate powders that may be produced include without limitation, $Li_3V_2(PO_4)_3$, α-$LiVOPO_4$, β-$LiVOPO_4$, $LiVP_2O_7$, $LiFe(PO_4)$, $Li_{2.9}Mg_{0.1}V_2(PO_4)_3$, $Li_3Fe_2(PO_4)_3$, or combinations thereof.

The resulting powder generally may comprise a high surface area. In particular embodiments, the powder may be highly porous. The porous powders may have a surface area in the range of about 10 $m^2/g$ to about 170 $m^2/g$. Surface areas may determined using the Brunauer-Emmett-Teller (BET) method. The BET method is a well known technique by those of skill in the art to determine surface area. See S. Brunauer, P. H. Emmett and E. Teller, J. Am. Chem. Soc., 1938, 60, 309, herein incorporated by reference. In some embodiments, the powder may have particles with diameters in the range of between about 1 nm and 100 nm, alternatively between about 5 nm and about 50 nm, alternatively between about 10 nm and about 35 nm.

In some embodiments, the powder may have carbon mixed with the calcined product. A carbon coating or matrix produced with the lithium metal phosphate may be desirable for better electronic conductivity.

EXAMPLES

To further illustrate various illustrative embodiments of the present invention, the following examples are provided.

Example 1

Synthesis of High Surface Area Lithium Metal Phosphates $Li_3V_2(PO_4)_3$ was the desired material to synthesize using exothermic reaction synthesis. Starting materials included lithium nitrate ($LiNO_3$), ammonium meta vanadate ($NH_4VO_3$), ammonium dihydrogen phosphate ($NH_4H_2PO_4$), and glycine ($NH_2CH_2COOH$). Synthesis reactions were performed in a double stainless steel beaker system. Once prepared, the starting materials was placed in the inner stainless steel beaker which was then placed in a larger stainless steel beaker containing a thin layer of sand at the bottom, which ensured even heating of the solution.

Reactants were weighed out in the correct ratios, dissolved in warm de-ionized water, placed in the stainless steel beaker, and heated on the hot plate until the reaction occurred. Typically, 10-15 minutes of heating initiated the reaction. Some byproducts were observed during the reaction process.

Figure 2:
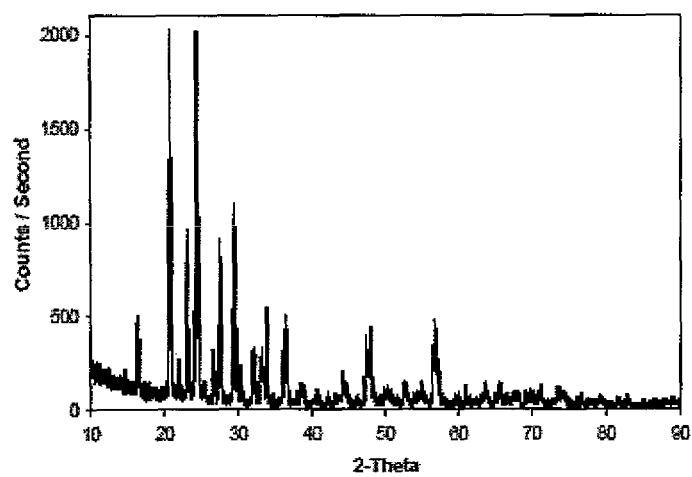
FIG. 2 shows X-ray diffraction pattern of monoclinic $Li_3V_2(PO_4)_3$ calcined at 850° C. for 4 hours in a 100% $H_2$ atmosphere.
Figure 3:
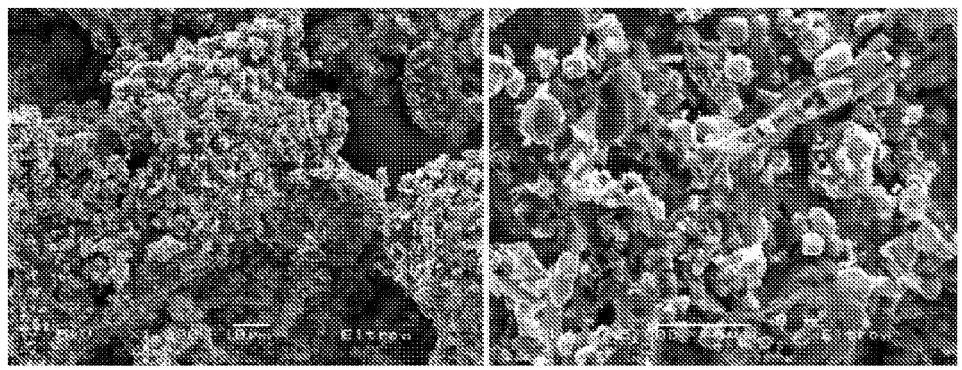
FIG. 3 shows SEM images of high surface area $Li_3V_2(PO_4)_3$. Left: x1,000 image. Right: x5,000 image.

Following exothermic reaction, a porous foam was formed, which easily collapsed into a fine powder. The powder was characterized by thermal analysis and X-ray diffraction (XRD). X-ray diffraction showed the product to be amorphous. Thermogravimetric analysis (TGA) of the combusted powder, shown in FIG. 1, showed a 40% weight loss as the powder was heated to 800° C. This large weight loss indicated that the powder had not completely reacted during the initial exothermic reaction synthesis, and a calcination step was added to form the desired $Li_3V_2(PO_4)_3$ product. The powder was calcined at 850° C. for 4 hours in a 100% $H_2$ atmosphere. 850° C. was chosen as the calcining temperature based on TGA experiments. A pure hydrogen atmosphere was used in an effort to maintain vanadium in the $3^+$ oxidation state. The X-ray pattern of the calcined product is shown in FIG. 2. The pattern matches exactly with the theoretical and experimental X-ray diffraction patterns for monoclinic $Li_3V_2(PO_4)_3$ reported in the literature. No secondary phases were observed.

Surface area analysis was performed using a Quantachrome NOVA 2200e surface area analyzer/porosimeter. Surface areas were determined from nitrogen volume/partial pressure isotherms using the Brunauer-Emmett-Teller (BET) method. BET analysis of the powder showed a surface area of 95 $m^2/g$.

Several reactions were performed in an effort to determine the optimal conditions for synthesis of $Li_3V_2(PO_4)_3$. For each reaction the Li:V:($PO_4$) ratio was maintained at 3:2:3. The metal to glycine ratio and the glycine to nitrate ratio were varied as shown in Table 1. Table 1 also summarizes the measured surface area and calculated particle sizes for monoclinic $Li_3V_2(PO_4)_3$ produced under these reaction conditions. Table 1 shows $Li_3V_2(PO_4)_3$ produced from a variety of different reactions. Four different metal to glycine ratio were used ranging from 0.5 to 0.75. Within these metal to glycine ratios the glycine to nitrate ratio was varied between 1.5 and 3.0. At higher metal to glycine ratios the reaction is less oxidizing. No definite trends are apparent although the data of Table 1 indicate that higher glycine to nitrate ratios generally give a higher surface area product.

TABLE 1

Combustion Conditions Used to Produce $Li_3V_2(PO_4)_3$.
All Samples Were Calcined at 850° C.
for 4 hours in 100% $H_2$ Following Combustion.

| Sample ID | Metal: Glycine Ratio | Glycine: Nitrate Ratio | $Li_3V_2(PO_4)_3$ Surface Area ($m^2/g$)* | $Li_3V_2(PO_4)_3$ Particle Size (nm) |
|---|---|---|---|---|
| E59-114 | 0.50 | 1.50 | 99.8 | 20 |
| E59-117 | 0.50 | 1.60 | 115.9 | 17 |
| E59-123 | 0.50 | 1.68 | 92.3 | 22 |
| E59-95 | 0.50 | 1.80 | 94.9 | 21 |
| E59-115 | 0.50 | 2.00 | 75.2 | 27 |
| E59-42 | 0.50 | 3.00 | 113.9 | 18 |
| E59-87 | 0.56 | 1.50 | 72.4 | 28 |
| E59-116 | 0.56 | 1.61 | 100.3 | 20 |
| E59-89 | 0.56 | 1.73 | 72.6 | 28 |
| E59-88 | 0.56 | 1.80 | 78.0 | 26 |
| E59-108 | 0.56 | 1.92 | 74.1 | 27 |
| E59-86 | 0.56 | 2.00 | 102.1 | 20 |
| E75-10 | 0.56 | 2.25 | 90.2 | 22 |
| E59-111 | 0.56 | 2.50 | 72.0 | 28 |
| E59-85 | 0.56 | 3.00 | 168.2 | 12 |
| E59-118 | 0.67 | 1.60 | 111.7 | 18 |
| E59-36 | 0.67 | 1.75 | 67.4 | 30 |
| E59-83 | 0.67 | 1.88 | 61.2 | 33 |
| E59-48 | 0.67 | 2.00 | 95.0 | 21 |
| E59-97 | 0.67 | 2.05 | 63.6 | 31 |
| E75-14 | 0.67 | 2.25 | 97.2 | 21 |
| E59-112 | 0.67 | 2.50 | 108.2 | 18 |
| E59-96 | 0.75 | 1.80 | 68.8 | 29 |

(3 All BET measurements have an error of ± 2%.

Figure 4:
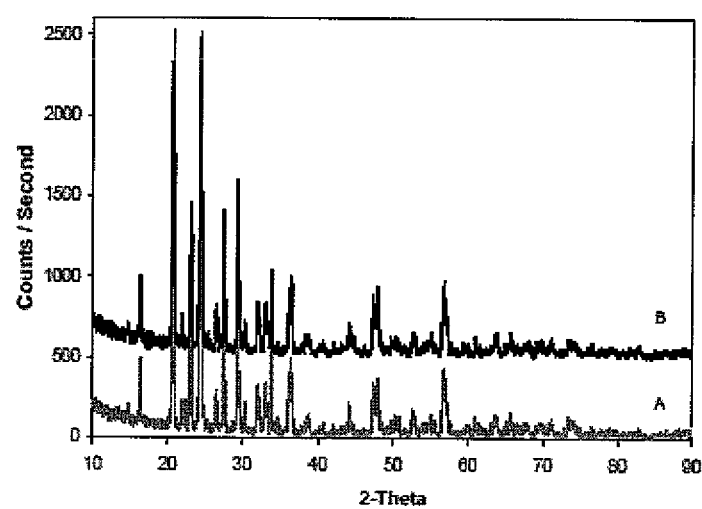
FIG. 4 shows XRD patterns for A) green powder $Li_3V_2(PO_4)_3$ and B) black powder $Li_3V_2(PO_4)_3$.
Figure 5:
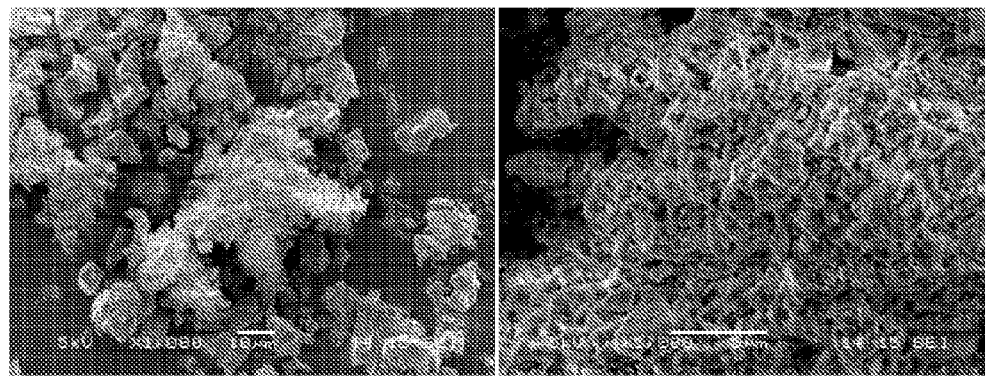
FIG. 5 shows SEM images of green $Li_3V_2(PO_4)_3$. Left: x1,000 image. Right: x5,000 image.
Figure 6:
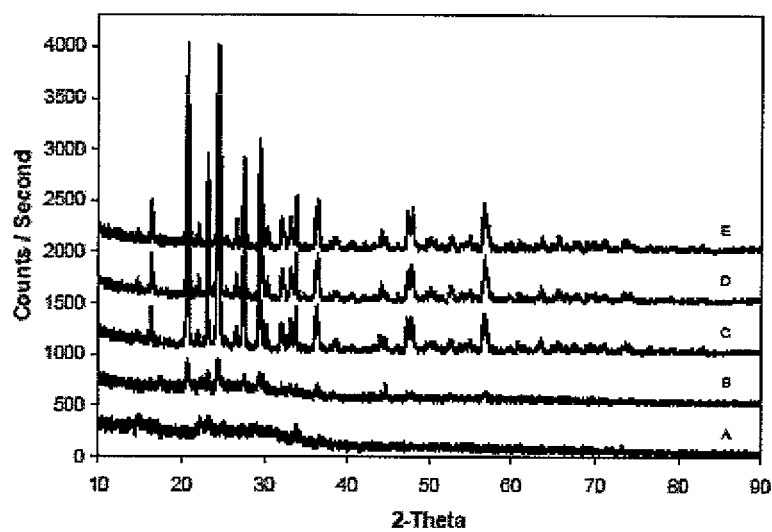
FIG. 6 shows 7X-ray diffraction patterns for A) uncalcined powder, B) calcined at 600° C. in 100% $H_2$ for 4 hours, C) calcined at 650° C. in 100% $H_2$ for 4 hours, D) calcined at 700° C. in 100% $H_2$ for 4 hours, and E) calcined at 850° C. in 100% $H_2$ for 4 hours.

The calcined powder resulting from these reactions was olive green in color compared to the black powder previously observed. The green powder was consistent with what has been reported in the literature for monoclinic $Li_3V_2(PO_4)_3$. X-ray diffraction showed that the black and green powders were equivalent, as shown in FIG. 4, and matched the expected powder pattern for $Li_3V_2(PO_4)_3$. No secondary phases were observed in either powder. BET results showed that the green $Li_3V_2(PO_4)_3$ had a smaller surface area of 0.74 $m^2/g$. SEM analysis showed a more uniform powder, which was not porous, as shown in FIG. 5. The SEM images in FIG. 6 show dense, large particles of $Li_3V_2(PO_4)_3$. These results indicated that the difference in color was due to the surface area/particle size of the different powders. Black powder corresponded to high surface areas nanoparticles. Green powder corresponded to low surface area micron sized powder.

Figure 7:
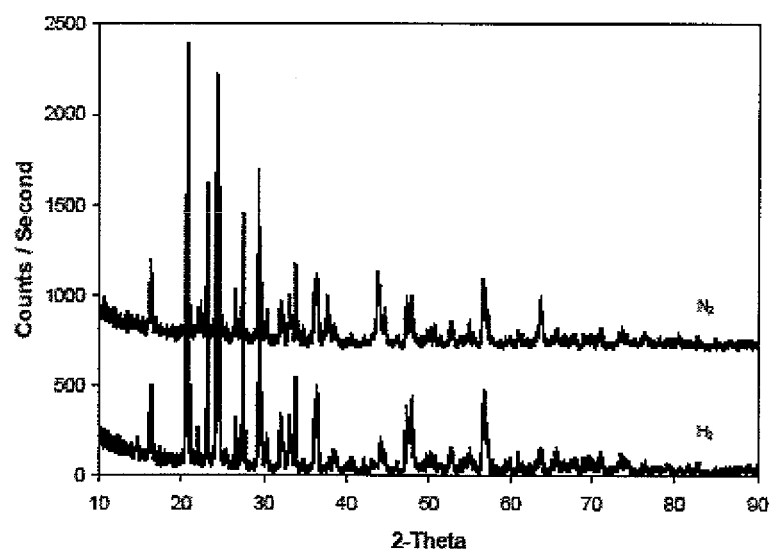
FIG. 7 shows $Li_3V_2(PO_4)_3$ calcined at 850° C. for four hours in $H_2$ and $N_2$.

Both calcining temperature and calcining atmosphere were investigated in an effort to reduce calcining temperature and cost while maintaining a single phase product. FIG. 7 shows the X-ray diffraction patterns for powder from the same exothermic reaction calcined at different temperatures in a pure hydrogen environment.

FIG. 6A shows that the uncalcined powder contains a small amount of crystalline material, but the peaks were not assignable to $Li_3V_2(PO_4)_3$. At 600° C., FIG. 6B indicates that $Li_3V_2(PO_4)_3$ is beginning to form. FIGS. 6C, 6D and 6E correspond to the desired monoclinic $Li_3V_2(PO_4)_3$ phase formed at 650, 700 and 850° C., respectively. These results showed that the calcining temperature can be reduced from 850° C. to 650° C. A calcining temperature of 850° C. was used to obtain single phase $Li_3V_2(PO_4)_3$. This is most likely due to difference in metal to glycine and glycine to nitrate ratios.

The atmosphere of the calcining step was also varied. Originally a 100% $H_2$ atmosphere was used to ensure that the $5^+$ oxidation state of vanadium in the starting material was reduced to $V^{3+}$ in $Li_3V_2(PO_4)_3$. It was found that under the correct conditions, the powder could be calcined in an inert environment and still obtain the desired single phase $Li_3V_2(PO_4)_3$. FIG. 7 shows the X-ray diffraction patterns for the same powder calcined in $N_2$ at 850° C. and in $H_2$ at 850° C.

Comparing the XRD patterns in FIG. 7 show that except for a few diffraction peaks $Li_3V_2(PO_4)_3$ is formed under an inert atmosphere during calcinating rather than a reducing $H_2$ atmosphere. This indicates that $V^{5+}$ is almost completely reduced to $V^{3+}$ during the synthesis. A partial reducing atmosphere of 10% $H_2$ should be sufficient for calcining $Li_3V_2(PO_4)_3$ rather than a 100% $H_2$ atmosphere.

Example 2

Preparation of Doped Lithium Metal Phosphates

A second powder that was prepared by the exothermic reaction synthesis was magnesium doped $Li_3V_2(PO_4)_3$. The reaction tested produced $Li_{3-x}Mg_xV_2(PO_4)_3$.

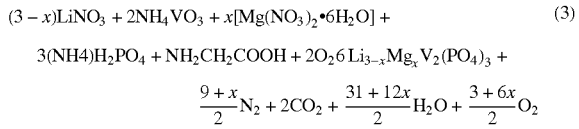

$$(3-x)LiNO_3 + 2NH_4VO_3 + x[Mg(NO_3)_2 \cdot 6H_2O] + \quad (3)$$
$$3(NH4)H_2PO_4 + NH_2CH_2COOH + 2O_2 6 Li_{3-x}Mg_xV_2(PO_4)_3 +$$
$$\frac{9+x}{2}N_2 + 2CO_2 + \frac{31+12x}{2}H_2O + \frac{3+6x}{2}O_2$$

Figure 8:
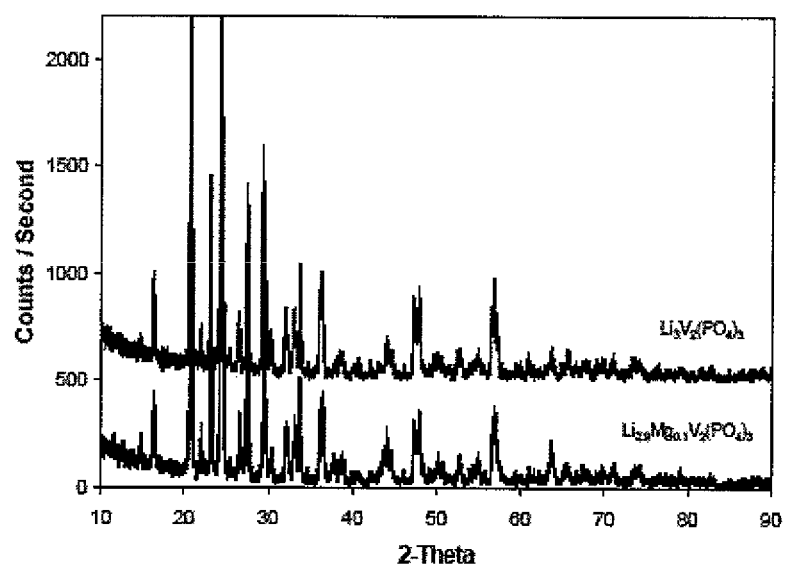
FIG. 8 shows XRD patterns for $Li_2Mg_{0.1}V_2(PO_4$ and $Li_3V_2(PO_4)_3$.

Values for x ranged from 0.05 to 0.3. The same procedure as previously described for $Li_3V_2(PO_4)_3$ was followed; however, magnesium nitrate hydrate $(Mg(NO_3)_2.6H_2O)$ was included in the mixture in the correct stoichiometric ratio. After exothermic reaction the powder was calcined at 850° C. for four hours in a $H_2$ atmosphere. FIG. 8 shows the X-ray diffraction patterns for both $Li_{2.9}Mg_{0.1}V_2(PO_4)_3$ and un-doped $Li_3V_2(PO_4)_3$. The patterns are equivalent indicating that the magnesium doped powder crystallized in the same structure as the un-doped powder. Based on charge balancing, $Li_{2.9}Mg_{0.1}V_2(PO_4)_3$ contains a small amount of $V^{2+}$ to compensate for the $Mg^{2+}$ cation. Powders were prepared with doping levels of 0.05, 0.1, 0.2, and 0.3 moles of magnesium. The powder patterns for all four compounds were equivalent. $Li_{2.9}Mg_{0.1}V_2(PO_4)_3$ was chosen as the magnesium doped material to characterize with battery testing.

Elemental analysis on the $Li_{2.9}Mg_{0.1}V_2(PO_4)_3$ was performed. Inductively Coupled Plasma (ICP) was used to determine the percentages of Li, Mg, V, and P. In addition, carbon analysis was performed to determine if elemental carbon was present in the synthesis product. $Li_{2.9}Mg_{0.1}V_2(PO_4)_3$ was calcined at 850° C. in $H_2$ for 4 hours before being sent out for elemental analysis. The XRD pattern, FIG. 8, showed that no secondary phases were present, and that the powder sent for analysis matched the XRD pattern for $Li_3V_2(PO_4)_3$. Elemental analysis results based on the relative ratios of the mass percent for Li, Mg, V, and P indicated a formula of $Li_{2.65}Mg_{0.1}V_{1.4}P_{2.2}O_{16}$. The fact that the powder composition did not match $Li_{2.9}Mg_{0.1}V_2(PO_4)_3$ exactly was probably due to incomplete dissolution of the powder in nitric acid. The results did however confirm the presence of magnesium in the product. In addition, carbon analysis did not indicate the presence of elemental carbon in the calcined product.

Example 3

Synthesis of $LiVOPO_4$ $LiVOPO_4$ in both the α and β forms were prepared by combining lithium nitrate ($LiNO_3$), ammonium metavanadate ($NH_4VO_3$), and ammonium dihydrogen phosphate ($NH_4H_2PO_4$) in a 1:1:1 stoichiometric ratio. Glycine was included in the reactant mixture in varying amounts as discussed below.

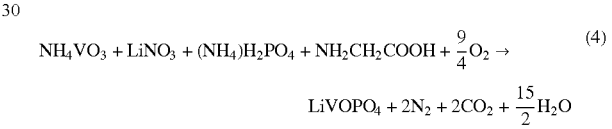

$$NH_4VO_3 + LiNO_3 + (NH_4)H_2PO_4 + NH_2CH_2COOH + \frac{9}{4}O_2 \rightarrow \quad (4)$$
$$LiVOPO_4 + 2N_2 + 2CO_2 + \frac{15}{2}H_2O$$

To change the ratio of glycine to nitrate in a reaction the amount of glycine was increased or decreased, or ammonium nitrate ($NH_4NO_3$) was added to the reaction mixture. Reactants were weighed out in the correct ratios, dissolved in warm de-ionized water, placed in a stainless steel beaker, and heated on a hot plate until a spontaneous evolution of gaseous byproducts was observed and the aqueous precursor solution was rapidly converted to a solid product. The precursor solution was placed in the inner stainless steel beaker which was then placed in the larger stainless steel beaker containing a thin layer of sand at the bottom. This set-up ensured even heating. As discussed below, the combination of proper reactant ratios and calcining conditions were used to control the formation of α vs. β-$LiVOPO_4$.

The first step in developing the optimal conditions to prepare α vs. β-$LiVOPO_4$ was to determine the best reactant ratios for the mild combustion reaction. Several different reactant ratios were tested as shown in Table 2.

TABLE 2

Reactant Ratios Tested for Preparation of α and β-$LiVOPO_4$.

| Reaction ID | Glycine:Nitrate | Metal:Glycine | Combustion Reaction |
|---|---|---|---|
| F79-10 | 4:1 | 1:2 | No Combustion |
| F79-21, 33 | 3:1 | 2:3 | Very Slow Reaction |
| F79-15, 19 | 2:1 | 2:3 | Slow Reaction |
| F79-17, 29 | 1.5:1 | 4:3 | Combustion |
| F79-9, 25 | 1:1 | 2:1 | Combustion |
| F79-37, 45, 52, 68, 69, 80, 88, 104 | 1:2 | 4:1 | Rapid Combustion |

TABLE 2-continued

Reactant Ratios Tested for Preparation of α and β-LiVOPO$_4$.

| Reaction ID | Glycine: Nitrate | Metal: Glycine | Combustion Reaction |
|---|---|---|---|
| F79-35 | 1:4 | 4:1 | Rapid Combustion |
| F79-41, 47, 50, 74, 75, 89, 105 | 1:4 | 8:1 | Slow Reaction |
| F79-39 | 1:8 | 8:1 | No Combustion |

Table 2 lists glycine to nitrate ratios and metal to glycine ratios tested. The glycine to nitrate ratio may determine how exothermic a particular combustion reaction is. Table 2 shows that fuel rich reactions (high glycine to nitrate ratios) and fuel-deficient (low glycine to nitrate ratios) tended to react slowly or not combust at all. Reactions that were slightly fuel-rich or fuel-deficient did combust. The fastest reactions involving very rapid conversion of aqueous slurry to powdered product had slightly fuel-deficient glycine to nitrate ratios of 1:2 and 1:4. While no flames were observed, these were not simply reactions involving evaporation of water. These reactions were rapid with large evolution of gaseous byproducts and were complete in less than one minute. Table 3 also lists the metal to glycine ratio for each reaction. Typically high metal to glycine reactions are less oxidizing. Due to time restrictions, the metal to glycine ratio was not varied extensively. High metal to glycine ratios of 4:1 or 8:1 were tested for combustion reactions used to characterize calcining conditions. In both gases, X-ray diffraction was used to show that the powder obtained from the combustion reactions was amorphous.

In general, the ratio of glycine to nitrate in the mild (i.e. flameless) combustion reaction was used to control the rate of reaction. Rapid reactions had more gas evolution in a very short period of time. Once it was determined that glycine to nitrate ratios of 1:2 and 1:4 resulted in the best combustion reactions they were used to determine the appropriate calcining conditions for preparation of single phase α-LiVOPO$_4$ and β-LiVOPO$_4$.

Calcining Conditions

Variables tested during calcining included maximum temperature, time at temperature, and calcining atmosphere. Calcining temperatures between 400 and 675° C. were tested. Calcining times ranged from four to eight hours, and nitrogen and air calcining atmospheres were tested. Initially, combusted powders were calcined in a reducing hydrogen atmosphere to reduce $V^{4+}$ in the ammonium metavanadate precursor to $V^{4+}$ in LiVOPO$_4$. However, calcining tests in an inert atmosphere or even an air atmosphere resulted in LiVOPO$_4$ formation indicating that a reducing atmosphere was not necessary. Following each calcining step X-ray diffraction was used to determine the phase(s) present. Nitrogen adsorption isotherms and BET calculations were used to characterize surface areas once single phase products were verified.

Through the systematic testing of these variables it was determined that calcining conditions could be used to control the formation of pure α-LiVOPO$_4$ or β-LiVOPO$_4$. In addition, results showed that combustion conditions combined with proper calcining conditions allowed preparation of high and low surface area α-LiVOPO$_4$ as well as single phase β-LiVOPO$_4$. Calcination of each compound was performed in two steps. At the end of each calcining step the calcined powder was cooled back to room temperature and ground up with a mortar and pestle. Table 3 summarizes the best calcining conditions for each compound.

TABLE 3

Summary of Calcining Conditions for Low and High Surface Area α-LiVOPO$_4$ and β-LiVOPO$_4$.

| Reaction ID | Calcining Temperature (° C.) | Calcining Time (hours) | Calcining Atmosphere | Product |
|---|---|---|---|---|
| F79-46 | 650 | 4 | Air | Low Surface Area |
|  | 650 | 8 | Air | α-LiVOPO$_4$ |
| F79-47 | 600 | 4 | N$_2$ | High Surface Area |
|  | 600 | 8 | N$_2$ | α-LiVOPO$_4$ |
| F79-50 | 400 | 4 | Air | β-LiVOPO$_4$ |
|  | 600 | 8 | N$_2$ |  |

Figure 9:
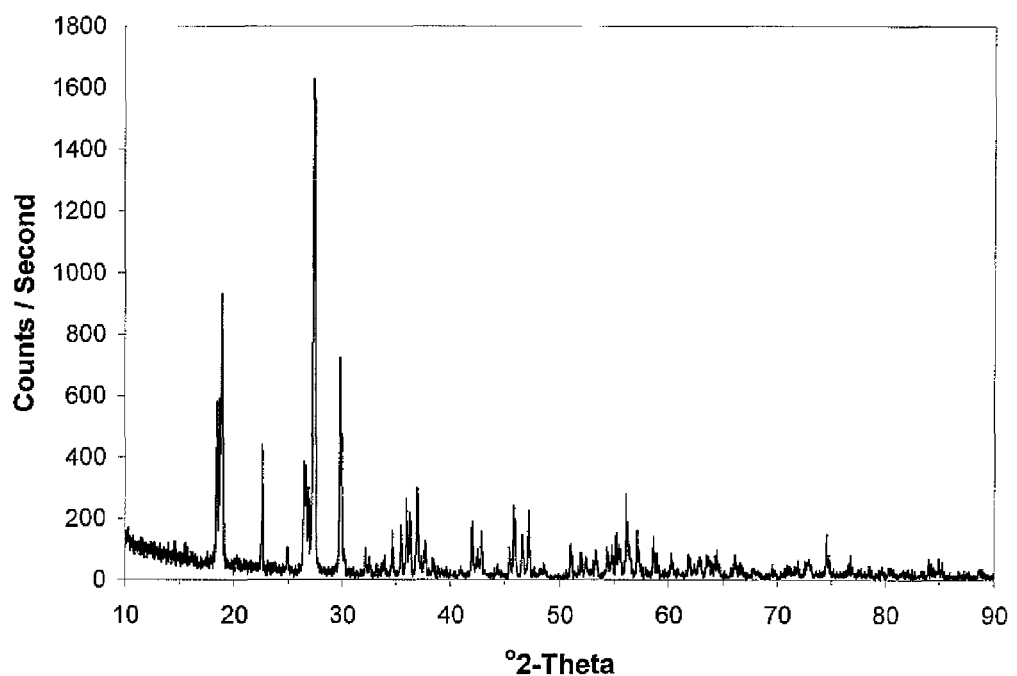
FIG. 9 shows an X-ray diffraction pattern for single phase triclinic α-$LiVOPO_4$.
Figure 10:
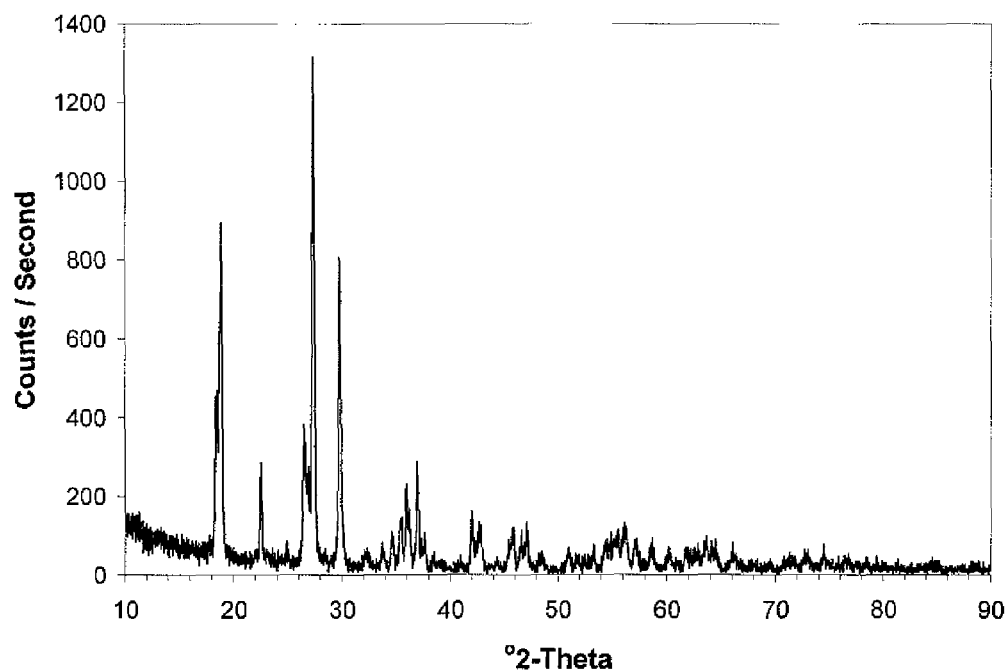
FIG. 10 shows an X-ray diffraction pattern of single phase high surface area α-$LiVOPO_4$.
Figure 11:
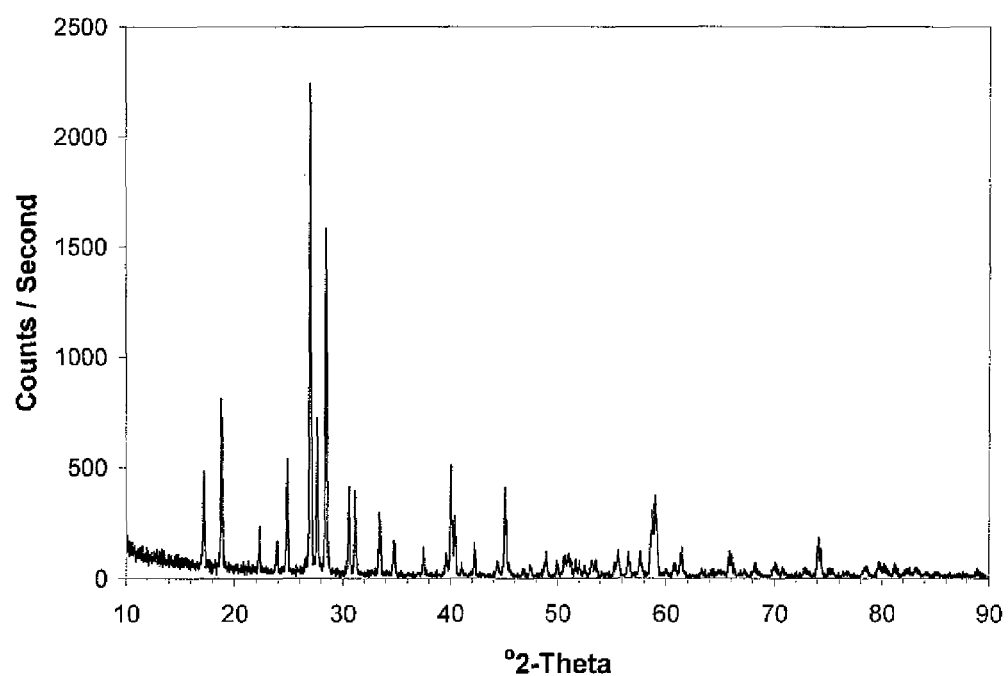
FIG. 11 shows an X-ray diffraction pattern for single phase β-$LiVOPO_4$.

Low surface area α-LiVOPO$_4$ was prepared by successive calcinations in air at 650° C. The first calcination was for four hours followed by a second calcination for eight hours. The product was a bright green crystalline powder. The X-ray pattern of the resulting single phase product is shown in FIG. 9. BET measurements showed this powder had a low surface area of 0.3 m$^2$/g. To prepare high surface area α-LiVOPO$_4$ the calcining temperature was reduced to 600° C. and was performed under an inert atmosphere. The first calcination was for four hours followed by a second calcination for eight hours. The resulting powder was olive green. X-ray diffraction confirmed single phase α-LiVOPO$_4$ as shown in FIG. 10, and BET measurements showed this powder had a significantly higher surface area of 40.6(1) m$^2$/g.

β-LiVOPO$_4$ was also prepared by a two step calcination. The first calcining was for four hours at 400° C. in air. For the second calcination the temperature was increased to 600° C. for eight hours in an inert atmosphere. The X-ray pattern for single phase β-LiVOPO$_4$ is shown in FIG. 11. The surface area was 0.5 m$^2$/g.

Example 4

LiVOP$_2$O$_7$ Synthesis

LiVP$_2$O$_7$ was prepared by the same general method described above. Lithium nitrate (LiNO$_3$), ammonium metavanadate (NH$_4$VO$_3$), and ammonium dihydrogen phosphate (NH$_4$)H$_2$PO$_4$ were combined in a 1:1:2 stoichiometric ratio and dissolved in de-ionized water as described above. Glycine was also added to the reaction mixture in varying amounts to test different glycine to nitrate ratios.

Four different glycine to nitrate ratios were tested as shown in Table 4.

TABLE 4

Reactant Ratios Used for Preparation of LiVP$_2$O$_7$.

| Reaction ID | Glycine:Nitrate | Combustion Reaction |
|---|---|---|
| F120-7, 9 | 2:1 | Slow Combustion |
| F79-13, 27 F120-19, 26, 27 | 1:1 | Combustion |
| F120-6, 8 | 1:4 | Combustion |
| F120-18 | 1:8 | Slow Combustion |

The results observed were similar to those found for preparation of LiVOPO$_4$. Fuel-rich reactions such as the 2:1 glycine to nitrate ratio and extremely fuel-deficient reactions such as the 1:8 glycine to nitrate ratio did not combust as well as ratios closer to 1:1.

Figure 12:
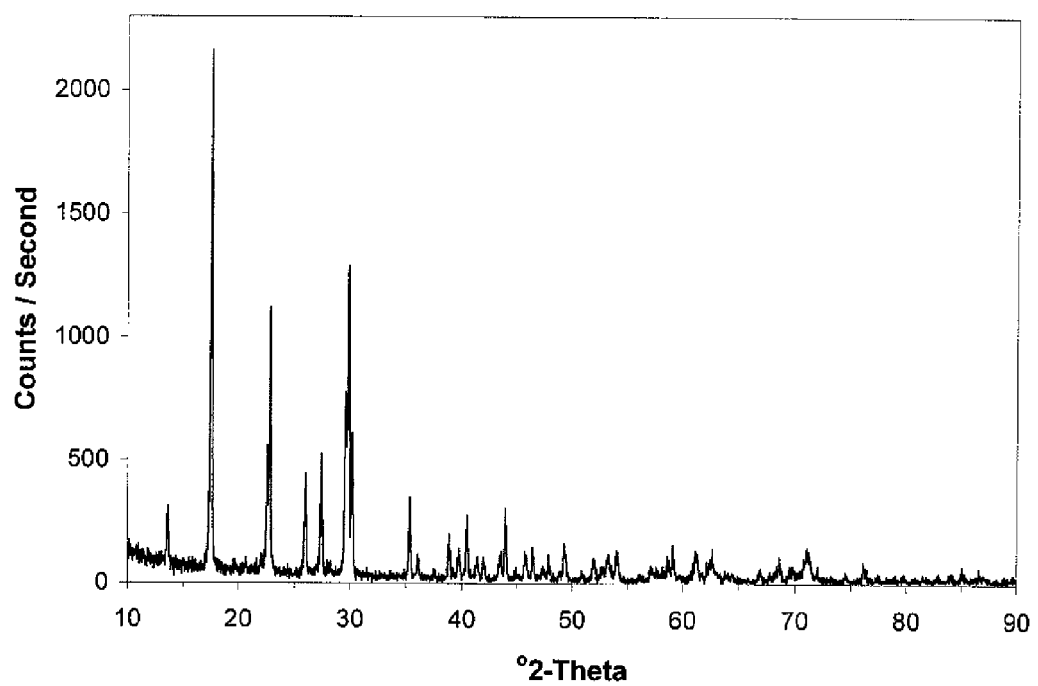
FIG. 12 shows an X-ray diffraction pattern for single phase $LiVP_2O_7$ following calcination at 650° C. for 4 hours in 100% $H_2$.
Figure 13:
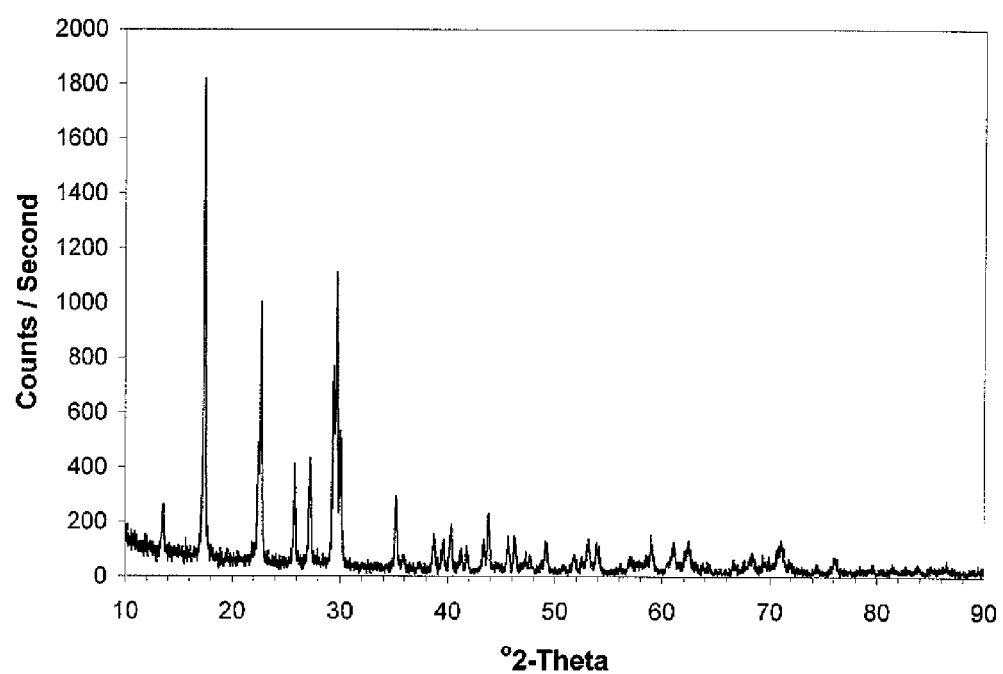
FIG. 13 shows an X-ray pattern of single phase $LiVP_2O_7$ calcined in a partially reducing atmosphere.

Powder obtained following combustion of 1:1 and 1:4 reactions was used to determine the best calcining conditions for formation of high surface area LiVP$_2$O$_7$. LiVP$_2$O$_7$ contains vanadium in the 3+ oxidation state compared to $V^{4+}$ in LiVOPO$_4$. Therefore a reducing atmosphere may be used in calcining rather than an inert atmosphere. Initially a 100% reducing atmosphere was used for calcination. FIG. 12 shows the X-ray diffraction pattern for LiVP$_2$O$_7$ calcined at 650° C. for four hours. A surface area of 10.4(3) m$^2$/g was measured for single phase LiVP$_2$O$_7$. For commercial production it would be desirable from a safety and cost standpoint to be able to calcine the combusted powder under a partially reducing atmosphere rather than a 100% hydrogen atmosphere. Therefore, calcinations were tested in a 10% H$_2$ balance Ar atmosphere. The calcination was performed in two steps including grinding the powder in-between steps to ensure a uniform product. The first step was at 600° C. for four hours and the second step was at 650° C. for four hours. The resulting powder was single phase LiVP$_2$O$_7$, as shown in FIG. 13. BET was used to characterize a surface area of 6.6 m$^2$/g. These results show that single phase LiVP$_2$O$_7$ can be prepared by calcination(s) in a partially reducing atmosphere without sacrificing phase purity or surface area.

Example 5

Lithium Intercalation

Two different powders were tested by reduction with n-butyllithium: Li$_3$V$_2$(PO$_4$)$_3$ prepared by 1) exothermic reaction synthesis and 2) solid-state processing. All experiments with n-butyllithium were carried out in an inert atmosphere drybox. The powder prepared by exothermic reaction synthesis had a surface area of 73.8 m$^2$/g and the powder prepared by solid-state processing had a much lower surface area of 11.8 m$^2$/g. 0.5 grams of each powder was combined with a known excess of n-butyllithium (2.5M n-butyllithium in hexanes, Aldrich). After 60 hours the n-butyllithium was decanted off the powder and the powder was rinsed three times with 10 mL of hexane. Isopropanol was then added to the combined rinses to convert any un-reacted n-butyllithium into lithium hydroxide. The isopropanol solution containing LiOH was then titrated with 1.21 M HCl. Moles of intercalated lithium were calculated by subtracting the moles of un-intercalated lithium determined by titration from the known initial concentration of lithium. Results are shown in Table 5.

Table 5 shows that 34.5% more lithium was intercalated into nanoparticle Li$_3$V$_2$(PO$_4$)$_3$ prepared by exothermic reaction synthesis compared the equivalent amount of micron size powder prepared by solid-state processing. This demonstrated that nanoparticle Li$_3$V$_2$(PO$_4$)$_3$ may perform better than micron sized Li$_3$V$_2$(PO$_4$)$_3$ as a lithium-ion secondary battery cathode.

TABLE 5

Moles of Lithium Intercalated in Li$_3$V$_2$(PO$_4$)$_3$ by Chemical Reduction with n-butyllithium

| Li$_3$V$_2$(PO$_4$)$_3$ Powder Synthesis Method | Surface Area (m$_2$/g) | Moles of Lithium Intercalated |
|---|---|---|
| Solid-State Processing | 11.8 | 0.0069 |
| Exothermic reaction Synthesis | 73.8 | 0.0104 |

Coin Cell Testing

To test high surface area phosphate materials as lithium-ion battery cathodes, coin cells were constructed using 2016 coin cell parts. Coin cells were constructed according to procedures reported in the literature. The key parts of the battery are the cathode, electrolyte, and anode.

The cathode was prepared using a tape casting technique. The tape casting slurry recipe developed consisted of the synthesized cathode material (Li$_3$V$_2$(PO$_4$)$_3$ or Li$_{3-x}$Mg$_x$V$_2$(PO$_4$)$_3$), Shawinigan carbon black which serves as a conducting medium within the tape, both o-xylene and ethanol as solvents, poly(vinyl butyral) as the binder, poly(ethylene glycol) and butyl benzyl phthalate as plasticizers, and Menhaden fish oil as the dispersant. The tape casting recipe is critical to producing a uniform casting of the cathode material. It is well known that the particle size of the powders used in the tape cast significantly affect the quality of the casting. High surface area powders use significantly more dispersant than low surface area powders. Table 6 shows the tape casting recipes used to prepare good tape cast cathodes for high and low surface area Li$_3$V$_2$(PO$_4$)$_3$.

TABLE 6

Amount of Tape Casting Components Used for High and Low Surface Area Li$_3$V$_2$(PO$_4$)$_3$

| Tape Casting Component | High Surface Area Li$_3$V$_2$(PO$_4$)$_3$ | Low Surface Area Li$_3$V$_2$(PO$_4$)$_3$ |
|---|---|---|
| Fish Oil | 0.57 g | 0.13 g |
| o-xylene | 4.75 g | 3.05 g |
| Ethanol | 2.97 g | 1.91 g |
| Li$_3$V$_2$(PO$_4$)$_3$ | 1.00 g | 1.00 g |
| Carbon Black | 0.20 g | 0.20 g |
| Poly(ethylene glycol) | 0.40 g | 0.13 g |
| Butyl Benzyl Phthalate | 0.33 g | 0.11 g |
| Poly (vinyl butyral) | 0.36 g | 0.12 g |

Table 6 also shows that high-surface area Li$_3$V$_2$(PO$_4$)$_3$ (73.8 m$^2$/g) used over four times as much dispersant (Menhaden fish oil) as the low surface area Li$_3$V$_2$(PO$_4$)$_3$ (11.8 m$^2$/g). As a consequence, the amount of solvent, plasticizer, and binder also had to be changed. To produce a tape of the prepared slurries, a double doctor blade was used to cast a 0.3 mm film of the slurry onto aluminum foil. The aluminum foil acts as a current collector in the final assembled battery. After casting, the tapes were heated to 110° C. in air to remove any water prior to placing them in the dry box. A punch was used to prepare %16" (about 1.4 cm) disks of the tape cast cathode for insertion into a lithium ion battery.

The anode of the lithium-ion batteries was lithium foil (Chemmetall Foote Corp.). The foil was kept in the drybox and prior to use the lithium foil was cleaned using 1200 grit emery cloth. The electrolyte prepared for lithium-ion battery coin cells was a polymeric matrix of poly(ethylene oxide) (PEO) and lithium perchlorate (LiClO$_4$). The solid electrolyte was prepared by slow addition of PEO and LiClO$_4$ to acetonitrile in an inert atmosphere using standard Schlenk line techniques. After stirring for 48 hours the acetonitrile was removed, and the electrolyte was poured onto a Teflon plate. The cast PEO electrolyte was then dried at 80° C. under vacuum. After drying the solid electrolyte was found to be 0.14 mm thick.

Batteries were assembled in an argon atmosphere drybox. The batteries were assembled in a sandwich-like manner using coin cell casing parts. Battery materials were combined in a battery press in the following order: coin cell case, spacer disk, lithium foil, PEO, cathode on aluminum foil, spacer disk, wave spring, gasket, coin cell cap.

Figure 14:
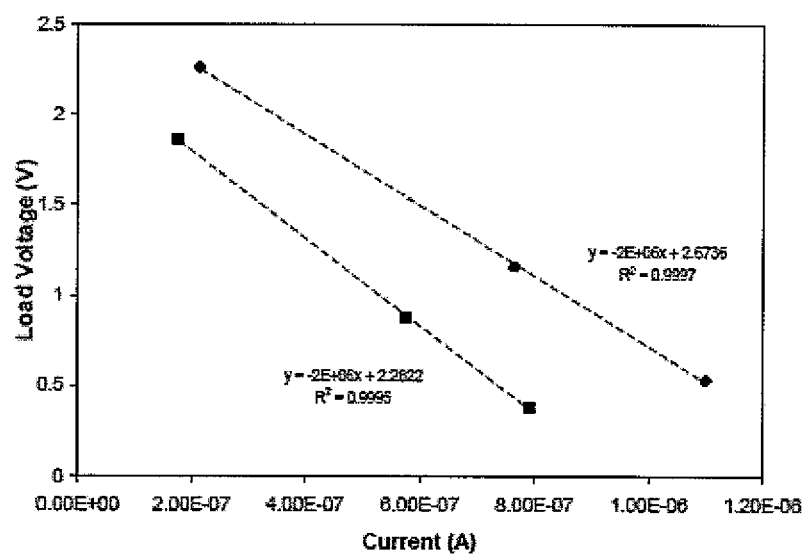
FIG. 14 shows current vs. voltage plots for as-prepared batteries containing high surface area (diamonds) and low surface area (squares) $Li_3V_2(PO_4)_3$.

Once constructed, the internal resistance of each battery was determined. To determine the internal resistance the voltage drop across the battery was measured for a series of resistors placed across the battery. A plot of measured voltage vs. the calculated current for each resistance gave the internal resistance as the slope of the line produced. FIG. 14 shows the voltage vs. current plot for batteries containing high and low surface area $Li_3V_2(PO_4)_3$. The equations of the lines show that both batteries possessed a high internal resistance of two megaohms. The fact that both batteries had the same internal resistance indicates that the resistance was due to the construction of the battery and was not due to the particle size (surface area) of the active material. Without being bound to theory, the high internal resistance may be due to several factors including tape cast cathode materials that were not optimized, the possibility of an aluminum oxide barrier layer on the cathode current collector, and a poor electrolyte. High voltages were needed to charge the battery as a consequence of this high internal resistance. Due to high internal resistance battery data collected using coin cells was not representative of cathode performance. The use of SWAGELOK® cell batteries rather than coin cells, as described below, resulted in battery data expected for phosphate based cathodes. In addition, the small amount of active material in each coin cell battery cathode limited the charging rate of the battery. Each battery contained less than three milligrams of active material in the cathode.

Figure 15:
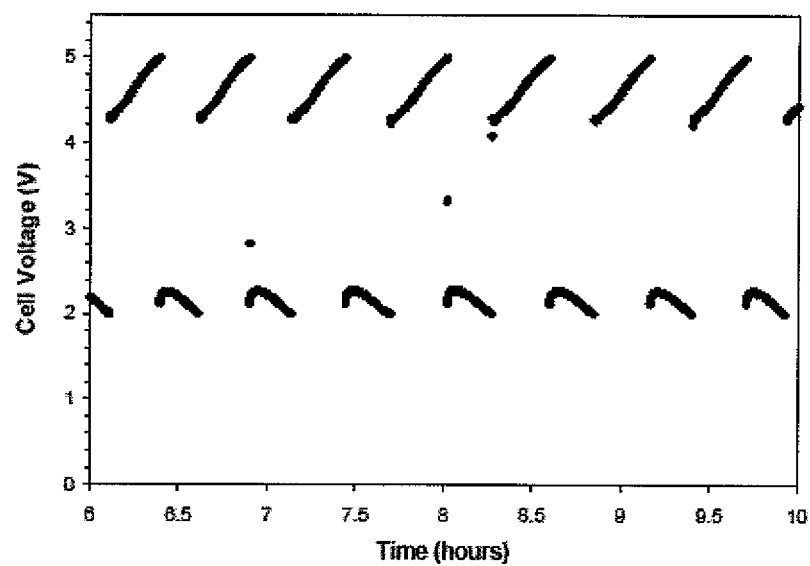
FIG. 15 shows charge/discharge cycling of a battery contain high surface area nanoparticle $Li_3V_2(PO_4)_3$ as the active cathode material.

Batteries were tested on a battery cycler. The cycler was capable of applying a current as low as 0.4 μA over a voltage range of 0 to 10 volts. During charging or discharge the applied current and measured voltage was recorded as a function of time. As an initial test, a battery containing high surface area $Li_3V_2(PO_4)_3$ was cycled between 2 and 5 volts. The discharge current was 0.8 μA and the charging current was 0.4 μA. FIG. 15 is a plot of voltage versus time. FIG. 15 only shows cycling between hours six and ten, however, the battery underwent cycling for 60 hours without a change in battery capacity. Charging of the battery occurred between 4.1 and 5.0 volts followed by discharging between 2.3 and 2.0 volts. The charging cycles in FIG. 15 indicate that the battery could be charge for a longer time if the maximum voltage was raised to ten volts. The maximum voltage was raised to ten and four different batteries were tested for specific capacity on the charge cycle. These batteries were equivalent except for the active material in the cathode. The active materials were low and high surface area $Li_3V_2(PO_4)_3$ and low and high surface area $Li_{2.9}Mg_{0.1}V_2(PO_4)_3$. Low surface area materials were prepared by solid state synthesis and high surface area materials were prepared using exothermic reaction synthesis. Results are shown in Table 7.

TABLE 7

Specific Capacity of High and Low Surface Area $Li_3V_2(PO_4)_3$ and $Li_{2.9}Mg_{0.1}V_2(PO_4)_3$

| Sample ID | Active Material | Surface Area of Active Material (m2/g) | Specific Capacity (mAh/g) |
|---|---|---|---|
| 75-105 | $Li_3V_2(PO_4)_3$ | 11.8 | 1.9 |
| 75-124 | $Li_3V_2(PO_4)_3$ | 73.8 | 3.3 |
| 89-35 | $Li_{2.9}Mg_{0.1}V_2(PO_4)_3$ | 3.8 | 4.2 |
| 89-14 | $Li_{2.9}Mg_{0.1}V_2(PO_4)_3$ | 94.2 | 4.8 |

Figure 16:
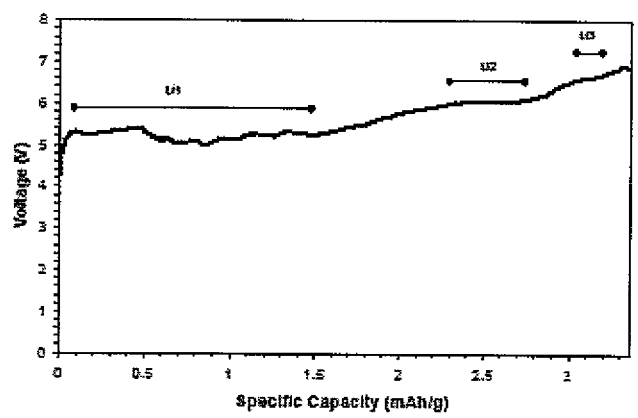
FIG. 16 shows voltage vs. specific capacity for high surface area $Li_3V_2(PO_4)_3$ powder produced by exothermic reaction synthesis.
Figure 17:
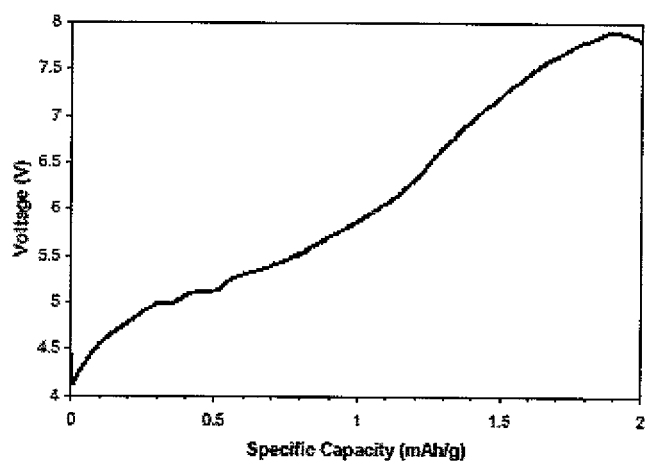
FIG. 17 shows voltage vs. specific capacity for low surface area $Li_3V_2(PO_4)_3$ prepared by solid-state synthesis.
Figure 18:
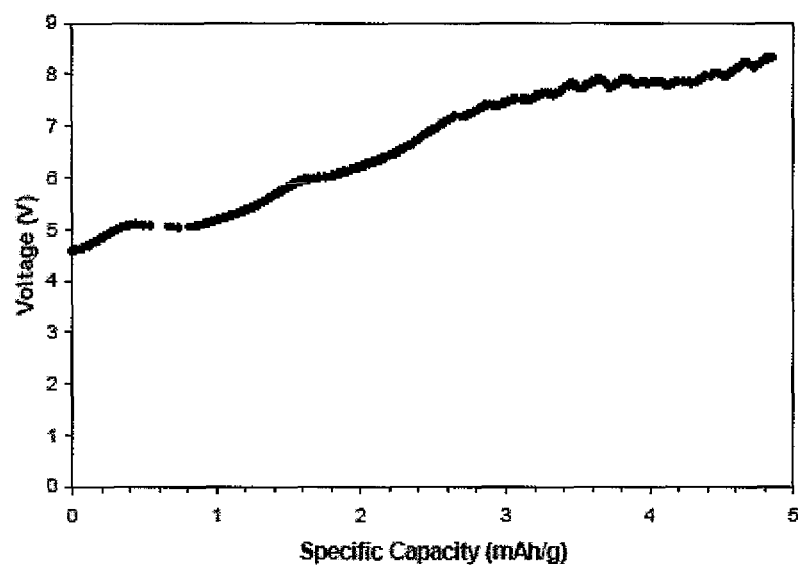
FIG. 18 shows voltage vs. specific capacity plot for a lithium-ion battery containing high surface area $Li_{2.9}Mg_{0.1}V_2(PO_4)_3$ powder prepared by exothermic reaction synthesis.
Figure 19:
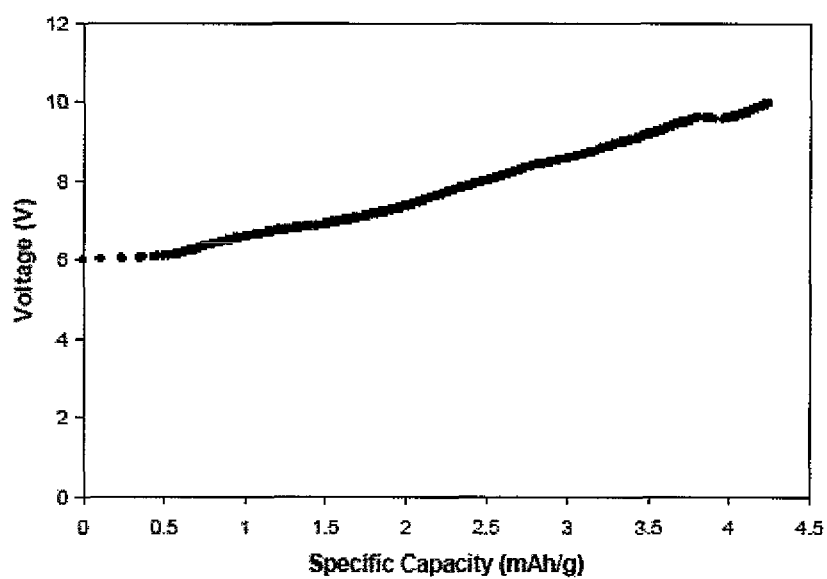
FIG. 19 shows voltage vs. specific capacity plot for a lithium-ion battery containing low surface area $Li_{2.9}Mg_{0.1}V_2(PO_4)_3$ powder prepared by solid-state synthesis.
Figure 20:
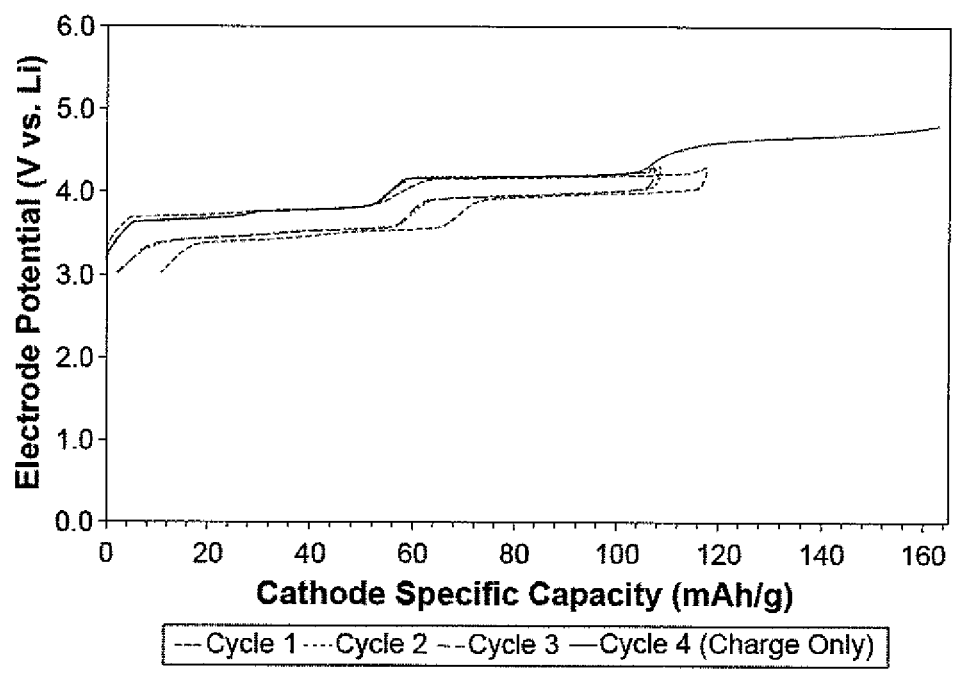
FIG. 20 shows voltage vs. specific capacity of $Li_3V_2(PO_4)_3$ tested in a SWAGELOK® test cell.
Figure 21:
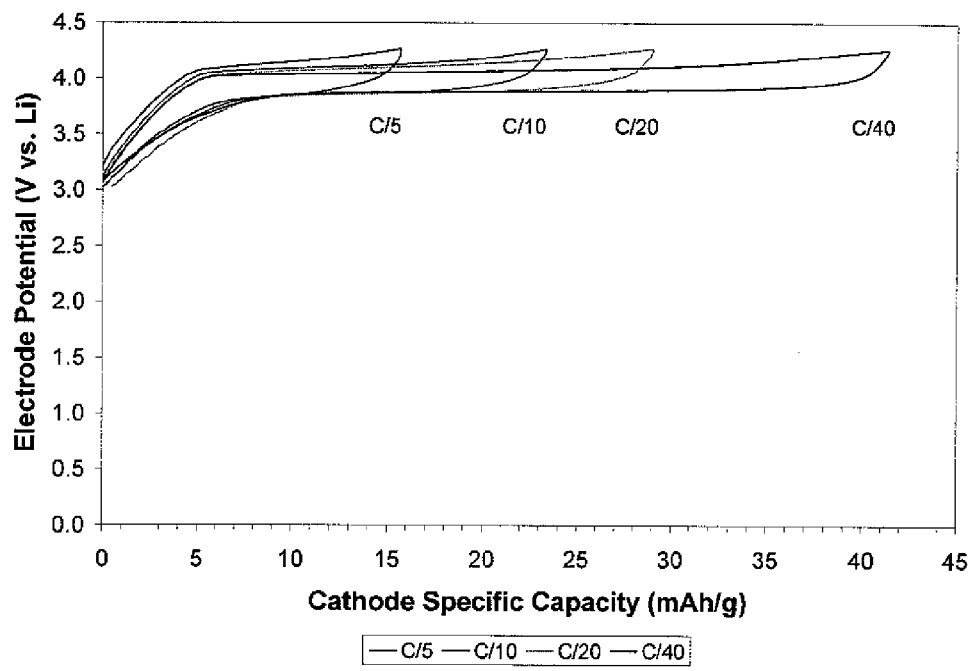
FIG. 21 shows a battery cycling rate comparison for high surface area α-$LiVOPO_4$.

Table 7 shows that for $Li_3V_2(PO_4)_3$, the powder with a surface area of 73.8 m²/g had a specific capacity of 3.3 mAh/g compared to a specific capacity of 1.9 mAh/g for the equivalent powder with a surface area of 11.8 m²/g. These results show that the nanoparticle powder had a specific capacity 42% higher than the micron sized powder. The charging curves for high and low surface area $Li_3V_2(PO_4)_3$ are shown in FIGS. 18 and 19 respectively. The plot of voltage vs. specific capacity in FIG. 16 shows that for high surface area $Li_3V_2(PO_4)_3$ three plateaus were observed which is consistent with literature reports. The three plateaus correspond to the three different crystallographic lithium atoms being removed from the $Li_3V_2(PO_4)_3$ lattice during charging of the battery. FIG. 17 shows that for the low surface area powder only two small plateaus were observed. The same specific capacity trend was found for the magnesium doped powder. $Li_{2.9}Mg_{0.1}V_2(PO_4)_3$ produced by exothermic reaction synthesis had a surface area of 94.2 m²/g and a specific capacity of 4.8 mAh/g. $Li_{2.9}Mg_{0.1}V_2(PO_4)_3$ produced by solid-state processing had a lower surface area of 3.8 m²/g and a 12.5% lower specific capacity of 4.2 mAh/g. The charging curves for high and low surface area $Li_{2.9}Mg_{0.1}V_2(PO_4)_3$ are shown in FIGS. 20 and 21 respectively. Specific capacity results for both $Li_3V_2(PO_4)_3$ and $Li_{2.9}Mg_{0.1}V_2(PO_4)_3$ demonstrated that nanoparticle phosphate compounds may have a higher specific capacity than micron size materials and are therefore may be better cathode materials for lithium-ion batteries.

Three plateaus were found during the charging cycle corresponding to the three different lithium atoms being extracted from the crystal lattice. The shape of the charging curves in FIGS. 18-21 provided indirect evidence of the benefit of nanoparticles vs. micron sized particles. The specific capacity plots for nanoparticle (high surface area) powders (FIGS. 18 and 20) show distinct plateaus corresponding to removal of the three different lithium atoms from the cathode material. On the other hand, the specific capacity plots for the micron size particle (low surface area) powders (FIGS. 19 and 21) do not show distinct plateaus. This may be an indication that nanoparticle materials provide easier insertion and removal of lithium from the phosphate lattice during charging or discharging.

Finally, the results in Table 4 also demonstrated the benefit of doping $Li_3V_2(PO_4)_3$ with a small amount of magnesium. For both high and low surface area powders, the magnesium doped cathode material had a higher specific capacity than the un-doped $Li_3V_2(PO_4)_3$. For $Li_3V_2(PO_4)_3$ with a surface area of 73.8 m²/g the specific capacity was 3.3 mAh/g. For $Li_{2.9}Mg_{0.1}V_2(PO_4)_3$ with a surface area of 94.2 m²/g the specific capacity was 4.8 mAh/g. This represented a 31.3% increase in specific capacity for powder that had only a 21.7% increase in surface area.

Example 6

Battery Testing for $Li_3V_2(PO_4)_3$, $\alpha$-LiVOPO$_4$, $\beta$-LiVOPO$_4$, and LiVP$_2$O$_7$ a. Battery Construction SWAGELOK® cell batteries were prepared rather than coin cells. The SWAGELOK® cells consisted of a ⅜" Teflon SW AGELOK®union which sealed to 304 stainless steel electrodes using Teflon ferrules. Cathode, electrolyte, a separator, and anode are sandwiched between the two electrodes. Electrodes allow easy connection to a battery cycler. It should be noted that these tests are referred to as battery tests when in fact they are single electrochemical cells and not batteries composed of multiple cells.

Calcined $\alpha$-LiVOPO$_4$, $\beta$-LiVOPO$_4$, and LiVP$_2$O$_7$ were combined with carbon black in a 84 w/o to 16 w/o ratio. The appropriate ratio of cathode active powder to carbon black was weighed out, combined, and dry ball milled overnight to create a uniform mixture.

SWAGELOK® cells were prepared in an inert atmosphere drybox as follows. Mixed cathode powder was weighed out and added to one side of the SWAGELOK® cell battery. Electrolyte was added to wet the powder. Two different electrolytes were used: a 1:1 mixture of ethylene carbonate (EC) and dimethyl carbonate (DMC), and a 2:1 ratio of EC to DMC. Both electrolytes contained 1 molar lithium hexafluorophosphate (LiPF$_6$). Two glass microfiber separator disks were placed on top of the cathode powder and additional electrolyte was added to completely wet the separator disks. Finally a ⅜" disk of lithium foil was placed on top of the separator disks as the anode. Batteries were prepared with excess lithium to ensure that cells were cathode limited.

b. Li$_3$V$_2$(PO$_4$)$_3$

FIG. 20 shows a plot of specific capacity vs. electrode potential for a battery cycled four times. For the first three cycles the battery was cycled between 3 and 4.3 V at the C/5 rate to remove the first two lithium atoms in Li$_3$V$_2$(PO$_4$)$_3$. The cathode had a specific capacity of 118 mAh/g, 109 mAh/g, and 107 mAh/g for the first, second, and third cycles respectively. On the fourth cycle the battery was charged to 4.8 V to remove the third lithium for a specific capacity of 163 mAh/g.

c. α-LiVOPO$_4$

FIG. 21 shows results for testing high surface area α-LiVOPO$_4$ at different cycling rates. α-LiVOPO$_4$ charges at 4.06 V and discharges at 3.89V. Cathode specific capacity was measured at four different cycling rates including C/5, C/10, C/20, and C/40. FIG. 21 shows that α-LiVOPO$_4$ had a higher capacity at slower cycling rates. At a C/5 rate cathode capacity was 15.7 mAh/g. Decreasing the cycling rate to C/10, C/20, and C/40 increased cathode specific capacity to 23.3, 29.0, and 41.3 mAh/g respectively. Data was collected for three to six cycles at each rate and greater than 99 percent cycling efficiency was recorded at each rate.

Figure 22:
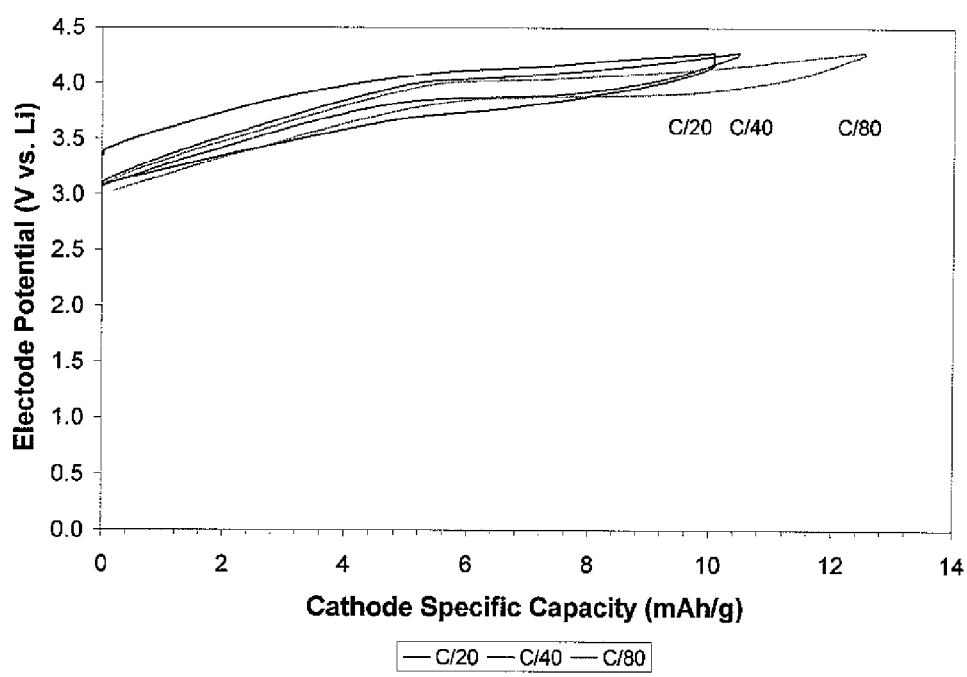
FIG. 22 shows battery cycling rate comparison for low surface area α-$LiVOPO_4$.

Battery cycling data was also collected for the low surface area α-LiVOPO$_4$, as shown in FIG. 22. At a C/20 and C/40 rate battery capacity was 10.0 and 10.4 mAh/g respectively and at a C/80 rate the capacity was 12.5 mAh/g. FIG. 22 clearly shows that cycling rates cannot be improved for low surface area cathodes. The cathode specific capacity was essentially the same for C/20, C/40, and C/80 cycling rates.

Figure 23:
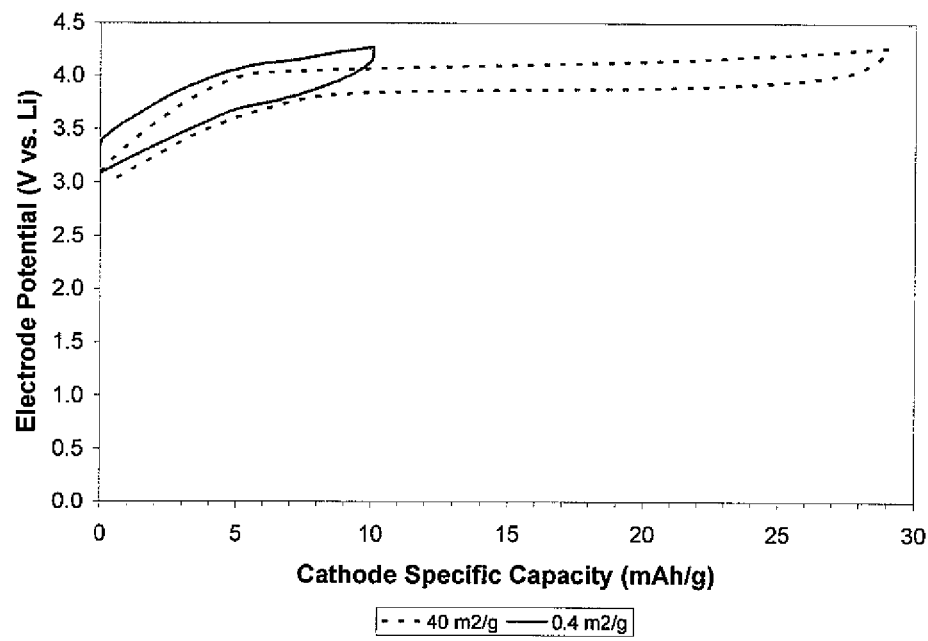
FIG. 23 shows a comparison of cathode specific capacity at the C/20 charge discharge rate for high (40 m²/g) and low (0.4 m²/g) surface area α-$LiVOPO_4$.

Comparing the cathode specific capacity for both batteries at the C/40 rate, FIG. 23, demonstrates the difference between high and low surface area cathodes. α-LiVOPO$_4$ with a high surface area of 40 m²/g had a specific capacity of 41.3 mAh/g while α-LiVOPO$_4$ with a low surface area of 0.4 m²/g had a specific capacity of 10.4 mAh/g.

Figure 24:
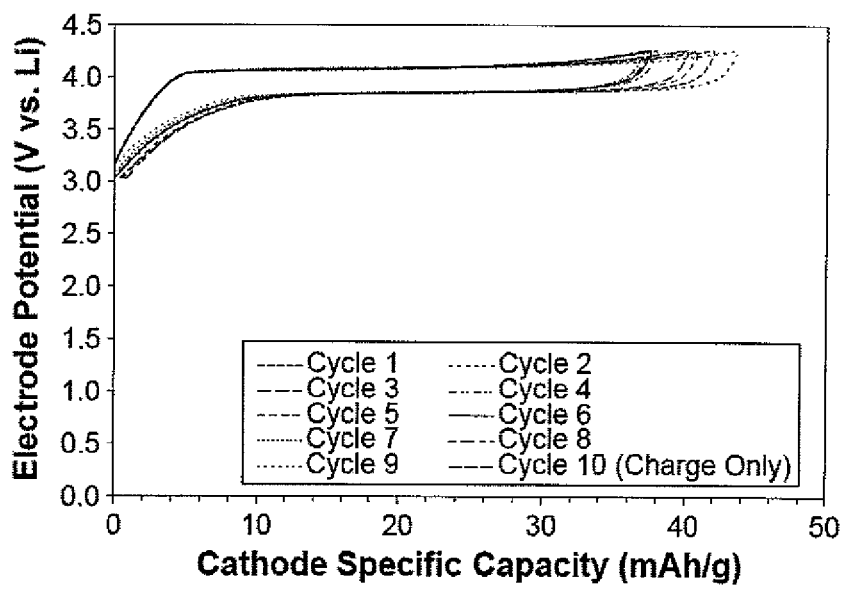
FIG. 24 shows battery cycling data for α-$LiVOPO_4$ cycled 10 times at the C/20 rate.

FIG. 24 shows cycling for a cell containing α-LiVOPO$_4$. Data for ten cycles was recorded. For each cycle, an efficiency greater than 99% was observed. The 10$^{th}$ cycle contains only charge information as the battery was removed from the cycler in the charged state for thermal analysis.

d. β-LiVOPO$_4$

Figure 25:
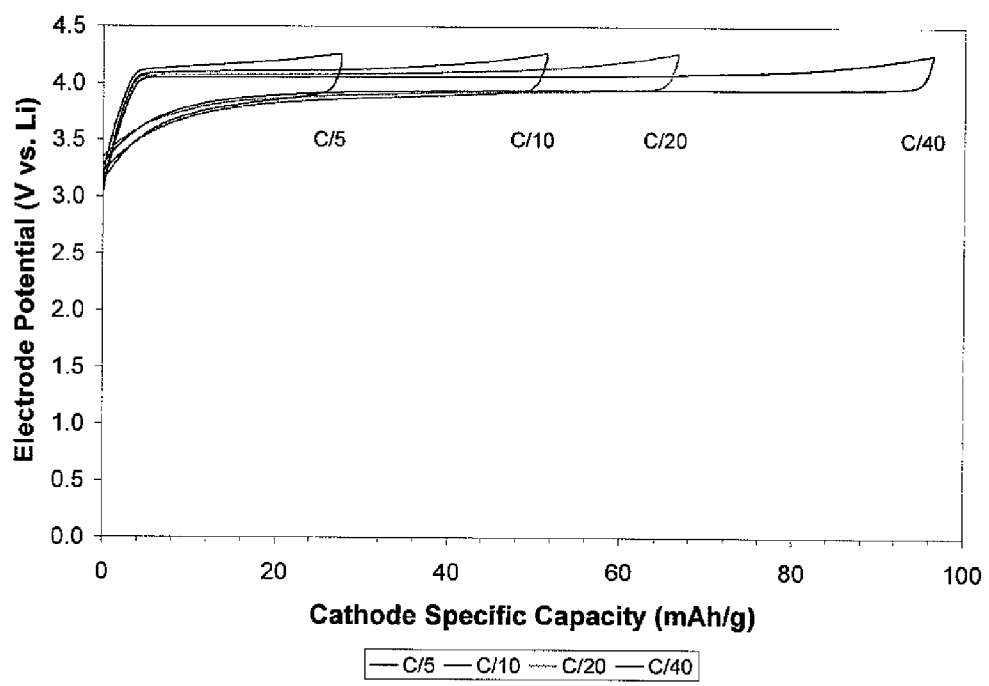
FIG. 25 shows battery cycling rate comparison for β-$LiVOPO_4$. The battery tested contained 84 $^w/_o$ β-$LiVOPO_4$ & 16 $^w/_o$ carbon black as the cathode, 1 M $LiPF_6$ in a 1:1 mixture of EC:DMC as the electrolyte, and a lithium foil anode.

Batteries containing β-LiVOPO$_4$ were also tested at different cycling rates. FIG. 25 shows cathode specific capacity as a function of electrode potential for a battery cycled at the C/5, C/10, C/20, and C/40 rates. At the C/5 rate a cathode specific capacity of 27.6 mAb/g was observed. Decreasing the cycling rate to C/10, C/20, and C/40 increased the specific capacity to 51.4, 66.6, and 96.3 mAh/g respectively. These are higher specific capacity values compared to those recorded for α-LiVOPO$_4$, although it should be noted that the battery in FIG. 25 contained a 1:1 EC:DMC compared to the 2:1 EC:DMC electrolyte used in the battery tested in FIG. 21.

Figure 26:
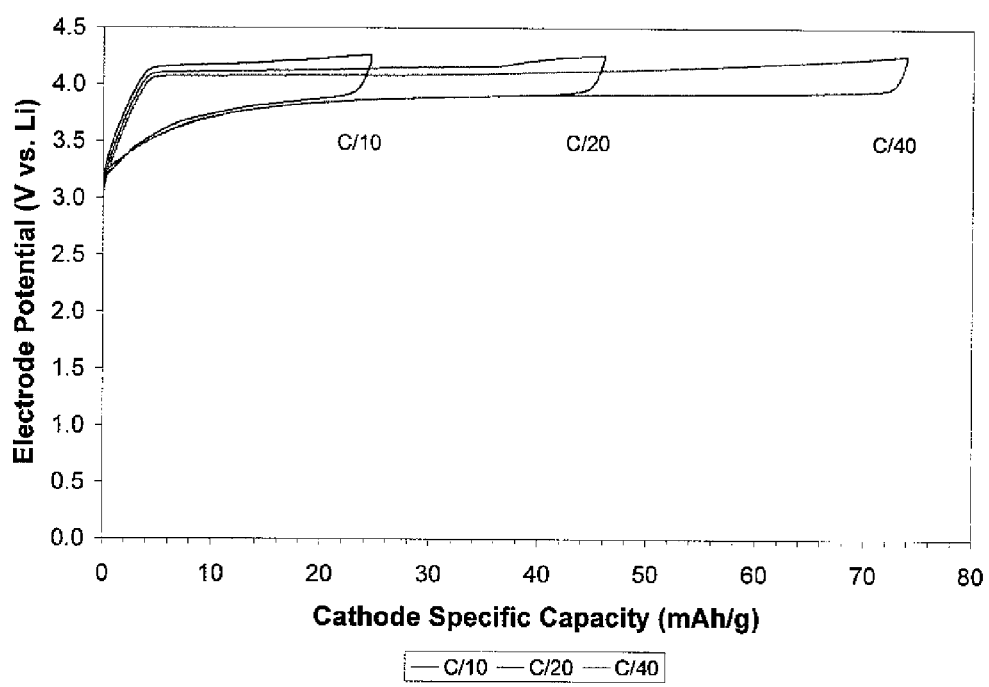
FIG. 26 shows battery cycling rate comparison for β-$LiVOPO_4$. The battery tested contained 84 $^w/_o$ β-$LiVOPO_4$ & 16 $^w/_o$ carbon black as the cathode, 1 M $LiPF_6$ in a 2:1 mixture of EC:DMC as the electrolyte, and a lithium foil anode.

A second battery containing β-LiVOPO$_4$ as the cathode was tested containing the 2:1 EC:DMC electrolyte. FIG. 26 shows specific capacity data collected at the C/10, C/20, and C/40 rates. Compared to FIG. 25, a slightly lower cathode specific capacity was observed.

Batteries tested with β-LiVOPO$_4$ had a surface area similar to the low surface area α-LiVOPO$_4$ tested, but much higher cathode specific capacity. This suggests that if the surface area of β-LiVOPO$_4$ can be increased even better battery performance will be achieved.

e. LiVP$_2$O$_7$

Figure 27:
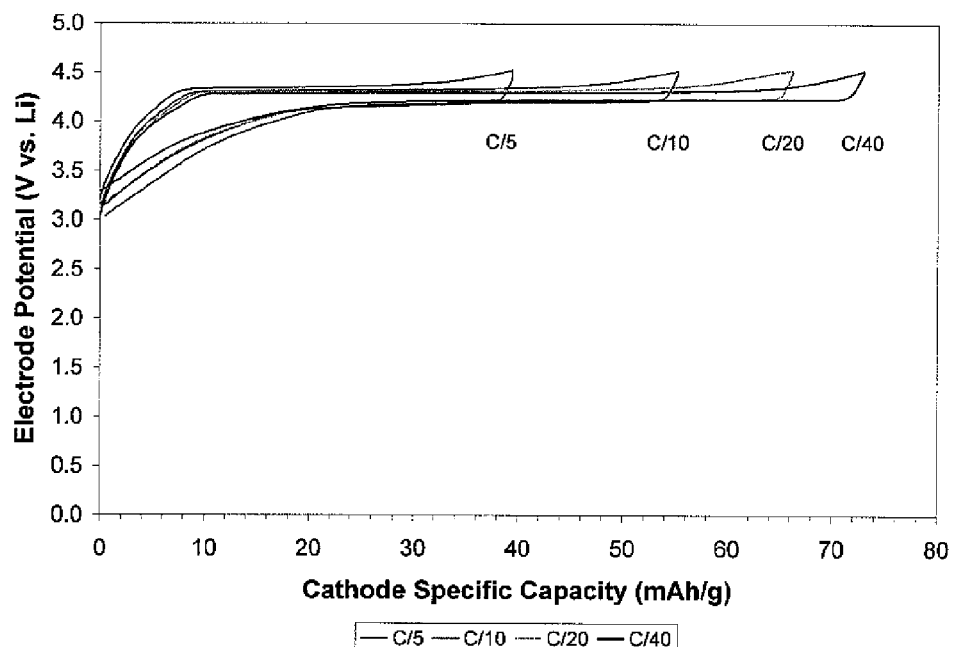
FIG. 27 shows battery cycling rate comparison for $LiVP_2O_7$. The battery tested contained 84 $^w/_o$ $LiVP_2O_7$ & 16 $^w/_o$ carbon black as the cathode, 1 M $LiPF_6$ in a 2:1 mixture of EC:DMC as the electrolyte, and a lithium foil anode.
Figure 28:
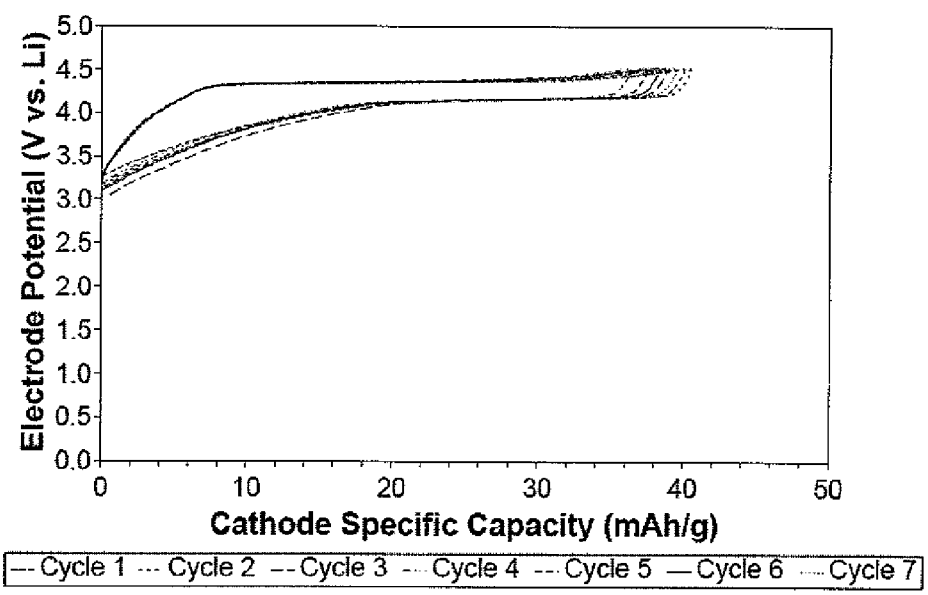
FIG. 28 shows seven complete charge/discharge cycles for $LiVP_2O_7$ at the C/5 rate.

FIG. 27 shows LiVP$_2$O$_7$ cathode specific capacity as a function of electrode potential for a battery cycled at C/5, C/10, C/20, and C/40 rates. At the C/5 rate a cathode specific capacity of 39.4 mAh/g was observed. Decreasing the cycling rate to C/10, C/20, and C/40 increased the specific capacity to 55.1, 66.1, and 72.8 mAh/g, respectively. Using the C/40 cycle, the LiVP$_2$O$_7$ cathode had a charging voltage of 4.31 V and a discharge voltage of 4.22 V. Seven complete charge/discharge cycles were performed at the C/5 rate, shown in FIG. 28. The efficiency for each of the seven cycles was greater than 99%.

Table 8 summarizes the best battery results for the aforementioned high surface area cathodes that were prepared and tested.

TABLE 8

Summary of Battery Testing Results.

| Cathode | Capacity at C/40 (mAh/g) | Charging Voltage | Discharging Voltage |
|---|---|---|---|
| α-LiVOPO$_4$ | 41.3 | 4.06 | 3.89 |
| β-LiVOPO$_4$ | 96.3 | 4.06 | 3.94 |
| LiVP$_2$O$_7$ | 72.8 | 4.31 | 4.22 |

Example 7

Synthesis of LiFePO$_4$

A spontaneous exothermic reaction process was applied to the synthesis of lithium iron phosphate (LiFePO$_4$). An acidic aqueous solution was used to keep iron nitrate in solution prior to the exothermic reaction. The acidic solution was achieved by replacing ammonium dihydrogen phosphate (NH$_4$H$_2$(PO$_4$)) with phosphoric acid as the phosphate precursor.

Three different reactant ratios were tested. The three reactions are shown in Equations 5, 6, and 7:

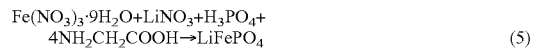

$$\text{Fe(NO}_3)_3 \cdot 9\text{H}_2\text{O} + \text{LiNO}_3 + \text{H}_3\text{PO}_4 + 4\text{NH}_2\text{CH}_2\text{COOH} \rightarrow \text{LiFePO}_4 \quad (5)$$

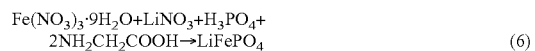

$$\text{Fe(NO}_3)_3 \cdot 9\text{H}_2\text{O} + \text{LiNO}_3 + \text{H}_3\text{PO}_4 + 2\text{NH}_2\text{CH}_2\text{COOH} \rightarrow \text{LiFePO}_4 \quad (6)$$

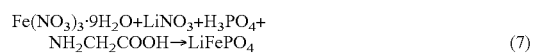

$$\text{Fe(NO}_3)_3 \cdot 9\text{H}_2\text{O} + \text{LiNO}_3 + \text{H}_3\text{PO}_4 + \text{NH}_2\text{CH}_2\text{COOH} \rightarrow \text{LiFePO}_4 \quad (7)$$

Figure 29:
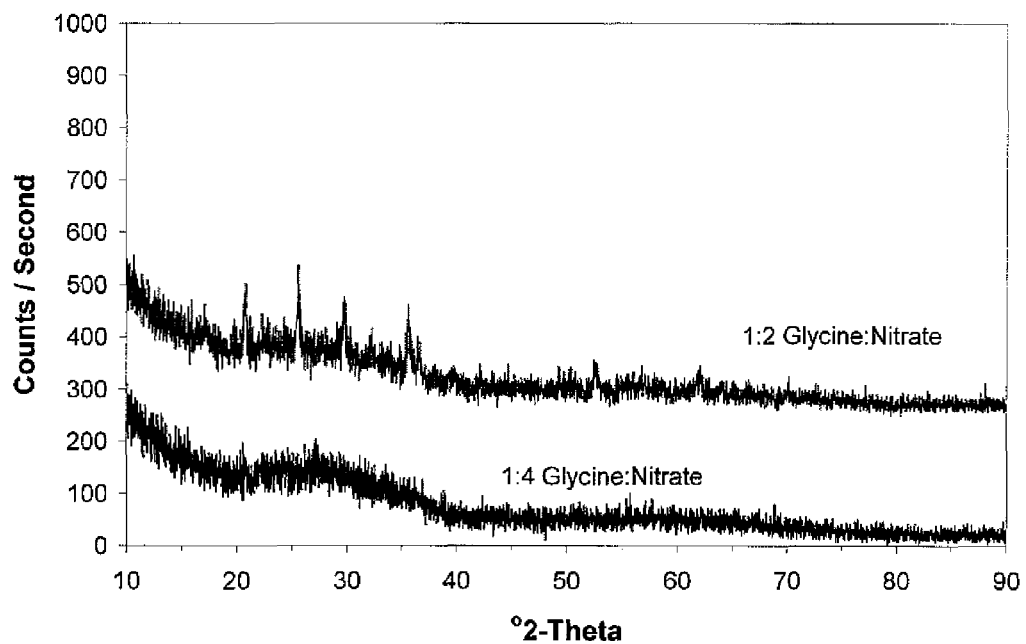
FIG. 29 shows X-ray diffraction patterns of the powder product from spontaneous exothermic reactions. Diffraction peaks correspond to $LiFePO_4$.

Reactants were dissolved in deionized water and the resulting solution heated on a hot plate to boil off the water. As the water was boiled off the reaction reached a point where the large volumes of gas were rapidly evolved; however, no flames were observed. An ash like powder was collected following each reaction. The difference between reactions 1, 2, and 3 is the amount of glycine included in the reaction. The glycine to nitrate ratio can be used as a qualitative measure of the "oxidizing or reducing" ability of the reaction. In Equation 1, the glycine to nitrate ratio was 1:1 indicating a neutral reaction. In Equations 2 and 3, the glycine to nitrate ratios were 1:2 and 1:4 respectively and both resulted in a rapid exothermic reaction. Based on the amount of glycine one could say that the 1:4 reaction is more oxidizing than the 1:2 reaction. This can be observed in the X-ray diffraction patterns of the exothermic reaction product. FIG. 29 shows that the 1:2 reaction product already contains crystalline LiFePO$_4$ with Fe$^{2+}$ rather than Fe$^{3+}$ in the iron nitrate starting material. The 1:4 reaction resulted in a completely amorphous exothermic reaction product. This observation directly affects the calcining conditions for each reaction product as discussed below.

Exothermic reaction products were calcined at 500° C. for 6 hours under inert or reducing atmospheres. Results are summarized in Table 1.

TABLE 1

Calcining Experiment Results.

| Reaction ID | Glycine:Nitrate | Exothermic Rxn XRD | Calcine Temp. (° C.) | Calcine Time (hrs) | Calcine Atmosphere | Calcine XRD |
|---|---|---|---|---|---|---|
| G55-009 | 1:2 | LiFePO$_4$ | 500 | 6 | N$_2$ | LiFePO$_4$ |
| G55-018 | 1:2 | LiFePO$_4$ | 500 | 6 | H$_2$ | LiFePO$_4$ |
| G55-016 | 1:4 | amorphous | 500 | 6 | N$_2$ | Li$_3$Fe$_2$(PO$_4$)$_3$ |
| G55-016 | 1:4 | amorphous | 500 | 6 | H$_2$ | LiFePO$_4$ |

When the glycine to nitrate ratio was 1:2, the exothermic reaction was slightly reducing and resulted in Fe$^{2+}$ formation prior to calcining. Therefore either a N$_2$ or H$_2$ atmosphere can be used during calcining to produce LiFePO$_4$. When the glycine to nitrate ratio was 1:4, the exothermic reaction was more oxidizing and Fe$^{3+}$ remained after the exothermic reaction (amorphous product). When calcined under nitrogen, Li$_3$Fe$_2$(PO$_4$)$_3$ was formed, which contained Fe$^{3+}$. A reducing atmosphere must be used to force the reduction of iron to Fe$^{2+}$ in LiFePO$_4$. Table 1 clearly shows that both exothermic reaction conditions and calcining conditions may be used to control formation of LiFePO$_4$.

Figure 30:
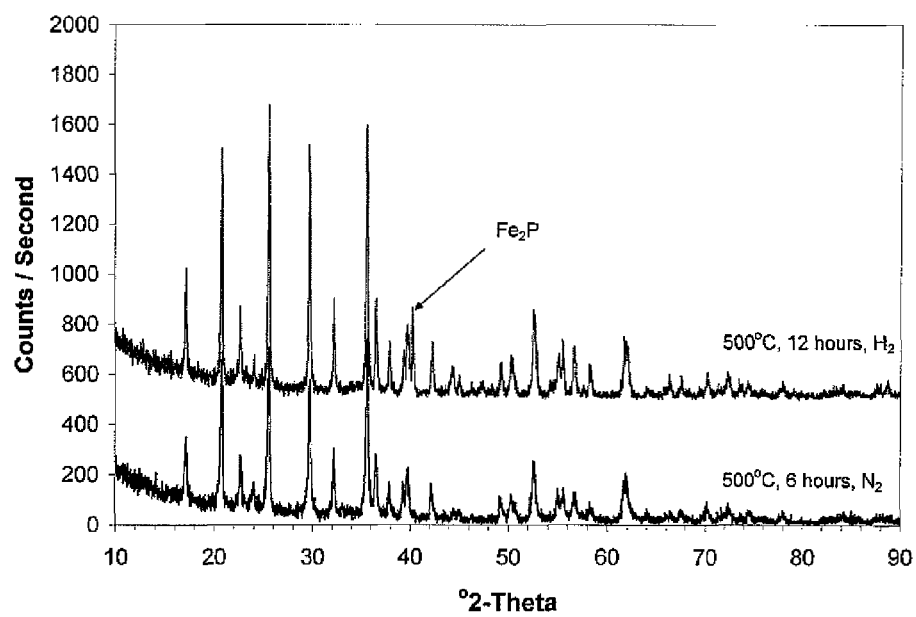
FIG. 30 shows X-ray patterns comparing calcining at 500° C., 6 hours (bottom) and $N_2$ vs. 500° C., 12 hours, $H_2$.

FIG. 30 shows the RD patterns of for the 1:2 reactions calcined under nitrogen vs. hydrogen. At 40.5° 2-theta, an extra peak was observed in the hydrogen pattern indicated by the arrow. This peak may be due to the presence of iron phosphide (Fe$_2$P). The reducing calcining atmosphere was enough to partially reduce the phosphate anion in LiFePO$_4$ to iron phosphide. The reduction was dependant on temperature. When the calcining temperature was increased to 600° C. for 6 hours under H$_2$ the resulting powder did not contain any LiFePO$_4$ and was a mixture of Fe$_2$P, FeP, and Li$_3$PO$_4$. Visually, powder containing Fe$_2$P was gray while pure LiFePO$_4$ was a brown powder. The fact that such a small amount of Fe$_2$P changed the color of the powder was good as it indicated that the Fe$_2$P was uniformly mixed and was likely coating the LiFePO$_4$ powder. The Fe$_2$P was somewhat unstable. It is unclear why the Fe$_2$P appeared to be unstable. Gray LiFePO$_4$ submitted for BET analysis came back brown. XRD before and after confirmed that before BET the sample contained Fe$_2$P and after BET the Fe$_2$P was not present. The BET process included a degassing step in which the powder was heated to 300° C. under helium. The presence of Fe$_2$P and furthermore the ability to control its formation was good. It is also important to note that when calcined, the exothermic reaction powder had a weight loss up to 16 percent depending on the calcining conditions. Glycine was not "burned-off" in the spontaneous exothermic reaction. This weight loss was likely at least partially due to formation of carbon from glycine. Formation of a carbon layer on LiFePO$_4$ was critical to good battery performance and needs to be further verified.

Figure 31:
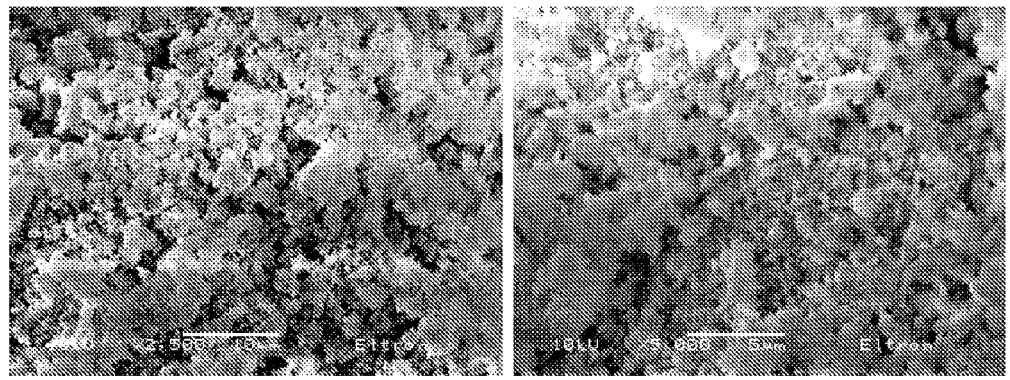
FIG. 31 shows SEM images of $LiFePO_4$ powders prepared using a 1:2 glycine:nitrate ratio. Left: x2500 SEM image and right: x5000 SEM image.
Figure 32:
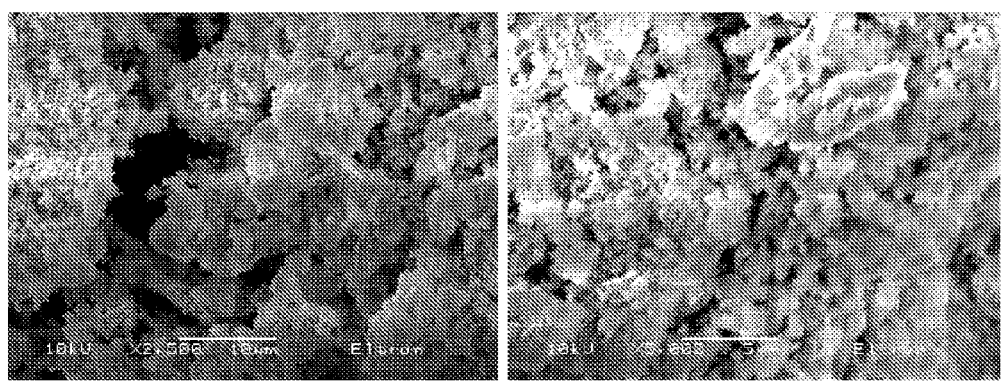
FIG. 32 shows SEM images of $LiFePO_4$ powders prepared using a 1:4 glycine:nitrate ratio. Left: x2500 SEM image and right: x5000 SEM image.

Two different powdered samples were submitted for Scanning Electron Microscopy (SEM) analysis. These were powders from the 1:2 and 1:4 glycine to nitrate reactions calcined twice at 500° C. for six hours under hydrogen. The second calcining was used to ensure complete reaction. No additional weight loss was observed during the second calcining step. SEM images for each powder are shown in FIGS. 31 and 32.

The same powders were also characterized for surface area using BET. Results showed surface areas of 12.3 m$^2$/g for the 1:2 reaction and 9.0 m$^2$/g for the 1:4 reaction. These surface areas were lower than expected based on the particle size observed in the SEM-images. Powder agglomeration may be causing a lower measured surface area than expected.

Battery Testing

For battery testing, the cathode was prepared by mixing 90 $^w/_0$ LiFePO$_4$ with 10 $^w/_0$ carbon black. The battery was constructed using a SWAGELOK® type cell. A lithium metal foil anode was used and the electrolyte was a 1:1 mixture of ethylene carbonate and dimethyl carbonate with 1 M LiPF6. A glass microfiber disk was used to separate the anode and cathode.

Figure 33:
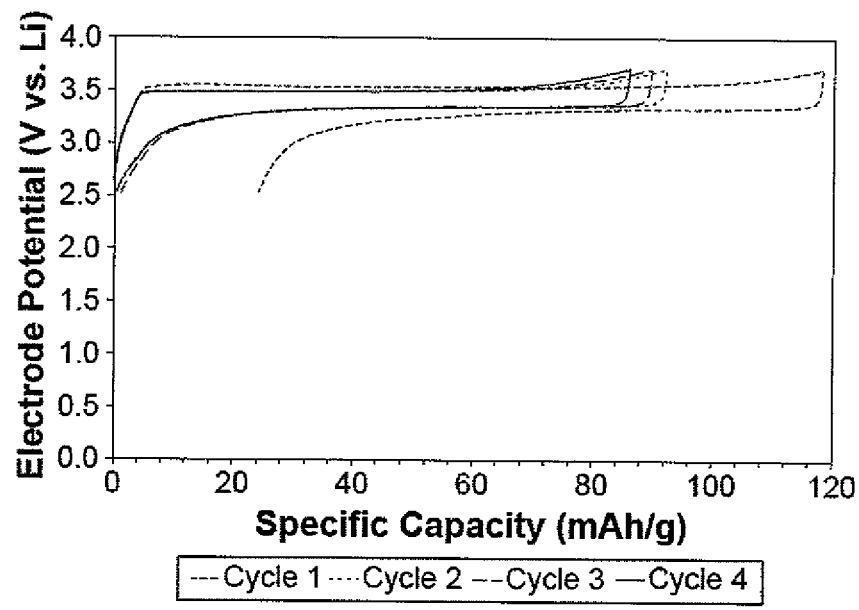
FIG. 33 shows cycling results for a battery containing a $LiFePO_4$ cathode tested at the C/5 rate.
Figure 34:
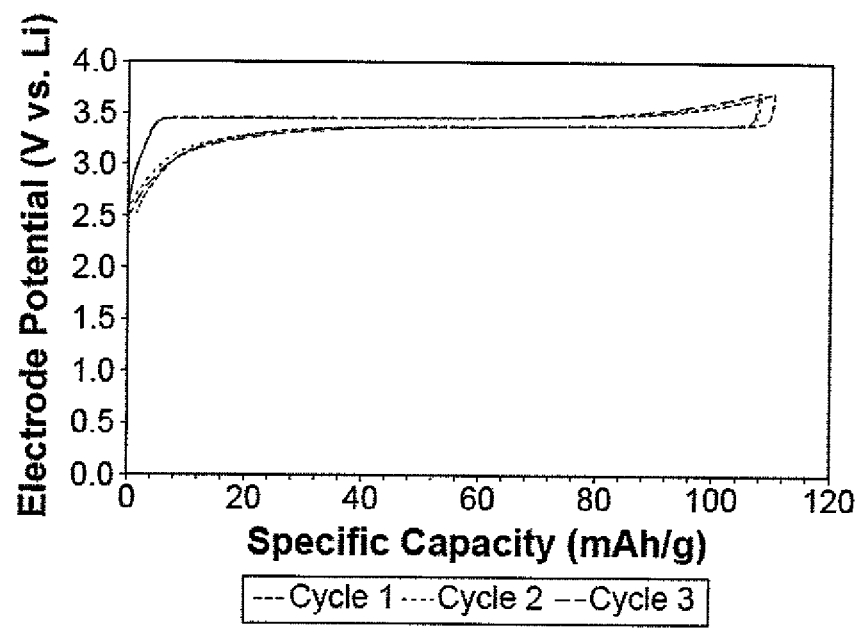
FIG. 34 shows cycling results for a battery containing a $LiFePO_4$ cathode tested at the C/25 rate.

Batteries were tested between 2.5 and 3.7 volts at the C/5 and C/25 rates. FIGS. 33 and 34 shows the cycling results for testing at the C/5 and C/25 rate, respectively. LiFePO$_4$ was also prepared using Li$_2$CO$_3$ as the lithium precursor rather than LiNO$_3$, as shown in Equation 8.

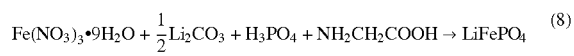

$$Fe(NO_3)_3 \cdot 9H_2O + \frac{1}{2}Li_2CO_3 + H_3PO_4 + NH_2CH_2COOH \rightarrow LiFePO_4 \quad (8)$$

Reactants were dissolved in deionized water and the resulting solution heated on a hot plate to boil off the water. As the water was boiled off the reaction reached a point where the large volumes of gas were rapidly evolved; however, no flames were observed. An ash like powder was collected following each reaction. The powder was ground in a mortar and pestle. The powder was calcined for 6 hours at 500° C. in a hydrogen atmosphere. A gray powder was found after calcining. X-ray diffraction confirmed that the powder was LiFePO$_4$.

Process criteria, equipment, and the like for any given implementation of the invention will be readily ascertainable to one of skill in the art based upon the disclosure herein. Use of the term "optionally" with respect to any element of the invention is intended to mean that the subject element is required, or alternatively, is not required. Both alternatives are intended to be within the scope of the invention.

Example 8

Synthesis of LiFePO$_4$ W/O Glycine

LiFe(PO4) may be synthesized using iron(II) gluconate dihydrate (HOCH$_2$[CH(OH)]$_4$CO$_2$)$_2$Fe.2H$_2$O, which is essentially an iron coordinated by a fuel similar to glycine. Thus, no glycine need be added to the reaction. Furthermore, replacing iron nitrate with iron(II) gluconate dehydrate removes excess nitrates ($NO_x$ formers) from the reaction. Production of lithium iron phosphate by this type of reaction is shown in Equation 9. Gaseous byproducts of the reaction are not shown for simplicity.

$$LiNO_3 + \{HOCH_2[CH(OH)]_4CO_2\}_2Fe \cdot 2H_2O + H_3PO_4 \rightarrow LiFePO_4 \quad (9)$$

The reaction could be further modified by replacing lithium nitrate with lithium carbonate. The reaction needs some source of nitrate so low cost ammonium nitrate could be added. This reaction is shown in Equation 10.

$$\tfrac{1}{2}Li_2CO_3 + \{HOCH_2[CH(OH)]_4CO_2\}_2Fe \cdot 2H_2O + H_3PO_4 + NH_4NO_3 \rightarrow LiFePO_4 \quad (10)$$

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference in the Description of the Related Art is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

REFERENCES

Herein Incorporated by Reference in their Entireties

1. Padhi, A. K.; Nanjundaswamy, K. S.; Goodenough, J. B. *J. Electrochem. Soc.* 1997, 144(4), 1188-1194.
2. Franger, S.; LeCras, F.; Bourbon, C.; Rouault, H. *Journal of Power Sources* 2003 in press.
3. Tackeray, M. *Nature Materials* 2002, 1, 81-82.
4. Croce, F.; D'Epifanio, A.; Reale, P.; Settimi, L.; Scrosati, B. *J. Electrochem. Soc.* 2003, 150(5), A576-A581.
5. Hu, Y. et. al. *J. Electrochem. Soc.* 2004, 151(8), A1279.
6. Yonemura, M. et. al. *J. Electrochem. Soc.* 2004, 151(9), A1352.
7. Barker, J.; Saidi, M. Y. *Lithium-Containing Phosphates, Method of Preparation, and Uses Thereof.* U.S. Pat. No. 6,720,110. Apr. 13, 2004.
8. Patoux, S. et. al. *J. Power Sources* 2003, 119-121, 278.
9. Huang, H. et. al. *Adv. Mater.* 2002, 14(21), 1525.
10. Saidi, M. Y. et. al. *J. Power Sources* 2003, 119-121, 266-272.
11. Lii, K. H. et. al. *J. Solid State Chem.* 1991, 95, 352-359.
12. Barker, J.; Saidi, M. Y.; Swoyer, J. L. *J. Electro. Soc.* 2004, 151(6), A796.
13. Barker, J.; Saidi, M. Y.; Swoyer, J. *Lithium-containing Materials.* U.S. Pat. No. 6,716,372. Apr. 6, 2004

14. Barker, J.; Saidi, M. Y.; Swoyer, J. *Preparation of Lithium-containing Materials.* U.S. Pat. No. 6,702,961. Mar. 9, 2004.
15. Barker, J.; Saidi, M. Y.; Swoyer, J. *Methods of Making Lithium Metal Cathode Active Materials.* U.S. Pat. No. 6,645,452. Nov. 11, 2003.
16. Barker, J. *Lithium-containing Phosphate Active Materials.* U.S. Pat. No. 6,890,686. May 10, 2005.
17. Barker, J.; Saidi, M. Y. *Lithium Based Phosphates, Method of Preparation, and uses Thereof.* U.S. Pat. No. 6,447,951 B1. Sep. 10, 2002.
18. Chick, L. A. et. al. *Materials Letters* 1990, 10(1-2), 6-12.
19. Pederson, L. R. et. al. *Materials Letters* 1991, 10(9-10), 437-443.
20. Purohit, R. D.; Sharma, B. P.; Pillai, K. T.; Tyagi, A. K. *Materials Research Bulletin* 2001, 36, 2711-21.
21. Stoker, J.; Hodge, J. *Method of Synthesizing Electrochemically Active Materials from a Slurry of Precursors.* U.S. Pat. No. 6,913,855. Jul. 5, 2005.

We claim:

1. A process for making a lithium metal phosphate powder comprising:
   a) combining at least one metal precursor, a lithium precursor, a phosphorous precursor, and a chelating carbon source in a solution to form a mixture;
   b) heating the mixture such that flameless combustion occurs to form a porous powder;
   c) calcining the powder to produce the lithium metal phosphate powder.

2. The process of claim 1, wherein the lithium metal phosphate powder has a surface area greater than 10 m2/g.

3. The process of claim 1, wherein the lithium metal phosphate powder is porous.

4. The process of claim 1, wherein the at least one metal precursor comprises a metal selected from the group consisting of Fe, V, Ni, Co, Cr, Cu, and Mn.

5. The process of claim 1, wherein the metal precursor comprises a metal nitrate selected from the group consisting of lithium nitrate, iron (III) nitrate hydrate, manganese (II) nitrate hydrate, nickel (II) nitrate hydrate, copper (II) nitrate hydrate, cobalt (II) nitrate hydrate, and chromium (III) nitrate hydrate.

6. The process of claim 1, wherein the metal precursor comprises ammonium metavanadate.

7. The process of claim 1, wherein the lithium precursor comprises a nitrate or a carbonate.

8. The process of claim 1, wherein the phosphorous precursor is selected from the group consisting of ammonium dihydrogen phosphate, diammonium hydrogen phosphate, phosphoric acid, and combinations thereof.

9. The process of claim 1, wherein the chelating carbon source is selected from the group consisting of glycine, hydrazine, sucrose, carbazole, urea, malonic acid, citric acid, and combinations thereof.

10. The process of claim 1, wherein the metal precursor and the chelating carbon source are combined in a ratio of from about 1:8 to about 8:1.

11. The process of claim 1, wherein the metal precursor and the chelating carbon source are the same compound.

12. The process of claim 11, wherein the metal precursor and the chelating carbon source both comprise iron (II) gluconate dihydrate.

13. The process of claim 1, wherein ammonium nitrate is added to the reaction mixture in (a).

14. The process of claim 1, further comprising doping the lithium metal phosphate by adding a doping precursor to the mixture.

15. The process of claim 14, wherein the doping precursor is selected from the group consisting of transition metal compounds, rare-earth metal compounds, alkaline earth metal compounds, and combinations thereof.

16. The process of claim 1, wherein the doping precursor comprises less than about 10 atomic percent of the lithium metal phosphate powder.

17. The process of claim 1, wherein the step of calcining the powder comprises calcining at a temperature of from about 250 C to about 1000 C.

18. The process of claim 1, wherein the step of calcining the powder comprises calcining for a period of from about 1 hour to about 12 hours.

19. The process of claim 1, wherein the powder is calcined in the presence of a gas selected from the group consisting of hydrogen gas, air, inert gas, and combinations thereof, at a concentration in the range of about 1% to about 100%.

20. The process of claim 1, wherein the calcined lithium metal phosphate powder comprises a carbon coating.

21. The process of claim 1, wherein the lithium metal phosphate powder has the formula, $Li_xM_y(PO_4)_z$, wherein M is selected from the group consisting of Fe, V, Ni, Co, Cr, Cu, VO, Mg, Mn, and combinations thereof, wherein x, y, and z represent the number of atoms of Li, M, and $PO_4$ ions, respectively, and x, y, and z range from 1 to 3.

22. A process for making a phosphate composition with a surface area of at least 10 $m^2/g$ comprising:
   a) combining at least a glycine and a nitrate to form a mixture and;
   b) heating the mixture such that flameless combustion occurs to form a powder;
   c) calcining the powder so as to obtain said composition.

23. The process of claim 22, wherein the powder is porous.

* * * * *